US012322909B2

(12) United States Patent
Evans et al.

(10) Patent No.: US 12,322,909 B2
(45) Date of Patent: Jun. 3, 2025

(54) ANGLED SUBASSEMBLY FOR AN ANGLED CONNECTOR

(71) Applicant: TE Connectivity Solutions GmbH, Steinach (CH)

(72) Inventors: Nicholas Lee Evans, Middletown, PA (US); Kevin Stauffer, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 479 days.

(21) Appl. No.: 17/708,891

(22) Filed: Mar. 30, 2022

(65) Prior Publication Data

US 2023/0318234 A1 Oct. 5, 2023

(51) Int. Cl.

*H01R 13/6593* (2011.01)
*H01R 4/18* (2006.01)
*H01R 43/048* (2006.01)

(52) U.S. Cl.

CPC ........... *H01R 13/6593* (2013.01); *H01R 4/18* (2013.01); *H01R 43/048* (2013.01)

(58) Field of Classification Search

CPC ..... H01R 13/6593; H01R 4/18; H01R 43/048
USPC ........................................................ 439/567
See application file for complete search history.

(56) References Cited

U.S. PATENT DOCUMENTS 4,173,386 A * 11/1979 Kauffman ............ H01R 24/564 439/582
5,061,206 A * 10/1991 Kawanami ........... H01R 9/0518 439/585
5,263,877 A * 11/1993 Mitani ................. H01R 9/0518 439/585
5,362,255 A * 11/1994 Anhalt ................. H01R 9/0518 29/862
5,879,190 A * 3/1999 Maruyama ........... H01R 9/0518 439/582
6,893,291 B2 * 5/2005 Wendling ............. H01R 9/0518 439/585
8,182,285 B2 * 5/2012 Annequin .............. H01R 24/54 439/582
8,628,353 B2 * 1/2014 Yokoyama ........... H01R 9/0518 439/409
8,628,359 B2 * 1/2014 Yokoyama ............. H01R 43/16 439/675

(Continued)

FOREIGN PATENT DOCUMENTS

CA 2644497 A1 * 5/2008 ....... H01R 13/65912
DE 102004029300 A1 * 1/2005 ............. H01R 24/40

(Continued)

OTHER PUBLICATIONS

International Search Report, International App. No. PCT/IB203/016987 International Filing Date Mar. 30, 2023.

*Primary Examiner* — Peter G Leigh
(74) *Attorney, Agent, or Firm* — Barley Snyder

(57) ABSTRACT

An angled subassembly of an angled connector includes an angled shield having a first shield section and a second shield section extending at a bend angle with respect to the first shield section, a cable disposed in the first shield section and the second shield section of the angled shield, and an inner ferrule disposed around the cable within the angled shield. The cable has a wire and a foil disposed around the wire. The inner ferrule electrically connects the foil to the angled shield.

20 Claims, 15 Drawing Sheets

(56) References Cited

U.S. PATENT DOCUMENTS

| | | | | |
|---|---|---|---|---|
| 9,099,797 | B1 * | 8/2015 | Duesterhoeft | H01R 4/58 |
| 9,153,878 | B2 | 10/2015 | Poma et al. | |
| 9,153,898 | B2 * | 10/2015 | Dendas | H01R 13/6581 |
| 9,214,743 | B2 * | 12/2015 | Duesterhoeft | H01R 24/545 |
| 9,673,578 | B1 * | 6/2017 | Lane | H01R 13/631 |
| 9,793,656 | B2 * | 10/2017 | Fabre | H01R 9/0524 |
| 10,008,787 | B2 * | 6/2018 | Kondo | H01R 4/48185 |
| 10,109,935 | B2 * | 10/2018 | Kondo | H01R 24/54 |
| 10,468,837 | B2 * | 11/2019 | Schroll | H01R 13/6593 |
| 2005/0282434 | A1 * | 12/2005 | Morikawa | H01R 9/0518 439/578 |
| 2015/0311602 | A1 | 10/2015 | Duesterhoeft et al. | |
| 2021/0057853 | A1 * | 2/2021 | Droesbeke | H01R 9/0518 |
| 2021/0057854 | A1 * | 2/2021 | Droesbeke | H01R 13/506 |
| 2021/0057855 | A1 * | 2/2021 | Droesbeke | H01R 13/6593 |
| 2021/0066856 | A1 * | 3/2021 | Droesbeke | H01R 24/568 |
| 2021/0257786 | A1 * | 8/2021 | Evans | H01R 13/506 |

FOREIGN PATENT DOCUMENTS

| | | | | | |
|---|---|---|---|---|---|
| DE | 102012208775 | A1 | * | 11/2013 | H01R 13/502 |
| DE | 112019006555 | T5 | * | 9/2021 | H01R 13/502 |
| EP | 2037538 | A2 | * | 3/2009 | H01R 11/11 |
| EP | 3783754 | A1 | * | 2/2021 | H01R 13/6582 |
| JP | H04215212 | A | | 8/1992 | |
| JP | 2012048818 | A | * | 3/2012 | |
| JP | 2014232585 | A | * | 12/2014 | |

* cited by examiner

ANGLED SUBASSEMBLY FOR AN ANGLED CONNECTOR

FIELD OF THE INVENTION

The present invention relates to a subassembly of a connector and, more particularly, to an angled subassembly for an angled connector.

BACKGROUND

An angled connector commonly includes a housing, contacts disposed within the housing, a shield disposed around the housing, and a cable disposed within the housing and electrically connected to the contacts. Angled connectors are used in applications in which the contacts of the connector are required to be disposed at an angle with respect to a direction in which the cable extends into the connector.

The cable extends in a single direction into the angled connector and the contacts disposed within the housing have a bend forming the angle desired for the angled connector. The contacts can be formed in a single piece and subsequently bent to the desired angle or can be formed in multiple pieces that are attached to one another to form the desired angle. These arrangements of the contacts, however, result in high component cost, complicated assembly, inconsistent formation of the necessary angles, and difficult impedance control.

SUMMARY

An angled subassembly of an angled connector includes an angled shield having a first shield section and a second shield section extending at a bend angle with respect to the first shield section, a cable disposed in the first shield section and the second shield section of the angled shield, and an inner ferrule disposed around the cable within the angled shield. The cable has a wire and a foil disposed around the wire. The inner ferrule electrically connects the foil to the angled shield.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
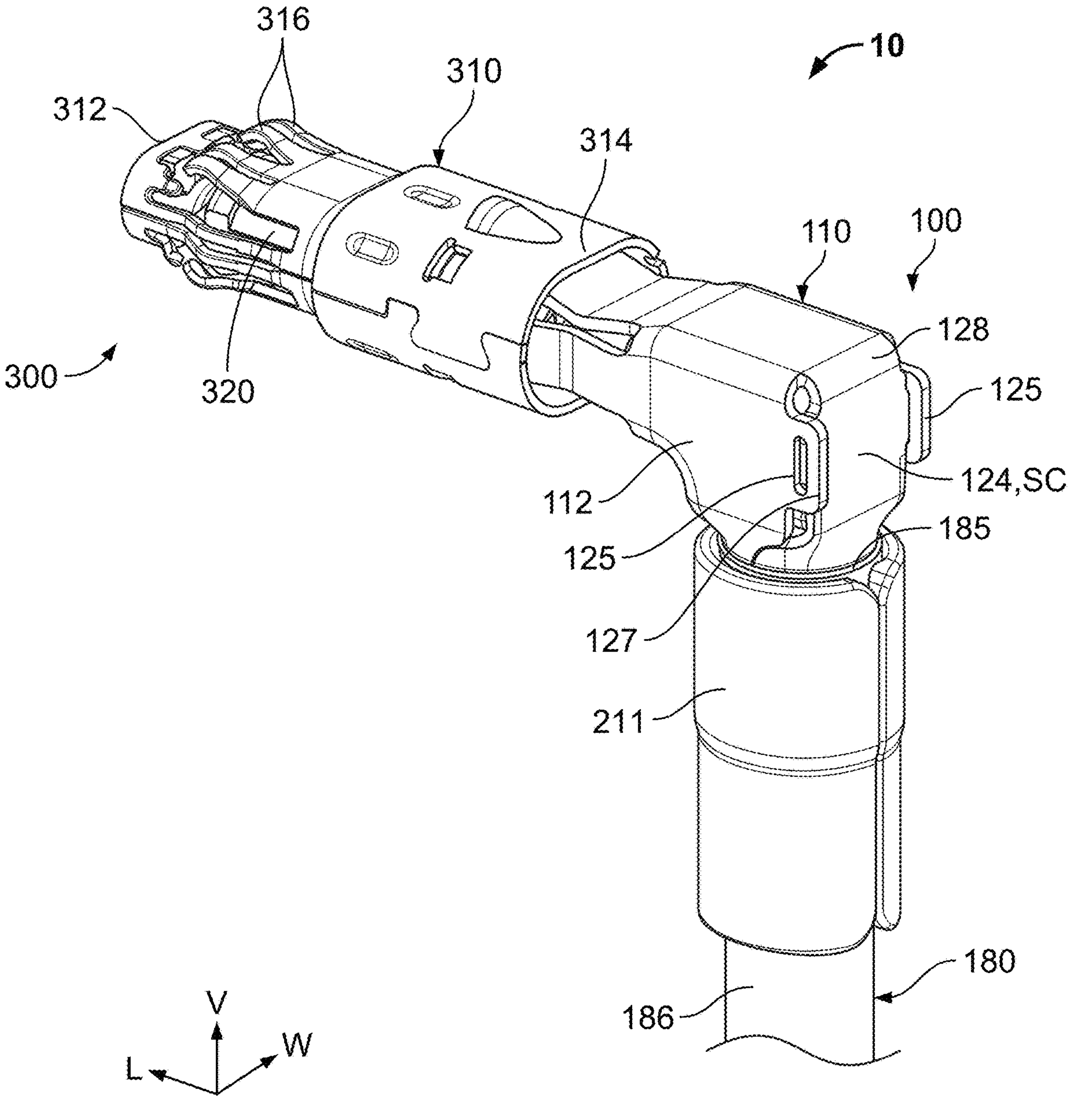
FIG. 1 is a perspective view of an angled connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as “longitudinal”, “width”, and “vertical”. These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

An angled connector 10 according to an embodiment, as shown in FIG. 1, includes an angled subassembly 100 and a mating subassembly 300 connected to the angled subassembly 100.

The angled subassembly 100, in the embodiment shown in FIGS. 1, 2, 7, and 8, includes an angled shield 110, an angled dielectric 150 disposed in the angled shield 110, a cable 180 disposed in the angled shield 110, a contact 190 electrically connected to the cable 180, an inner ferrule 200 disposed around the cable 180 within the angled shield 110, and an outer ferrule 211 disposed around the cable 180 and the angled shield 110.

Figure 3:
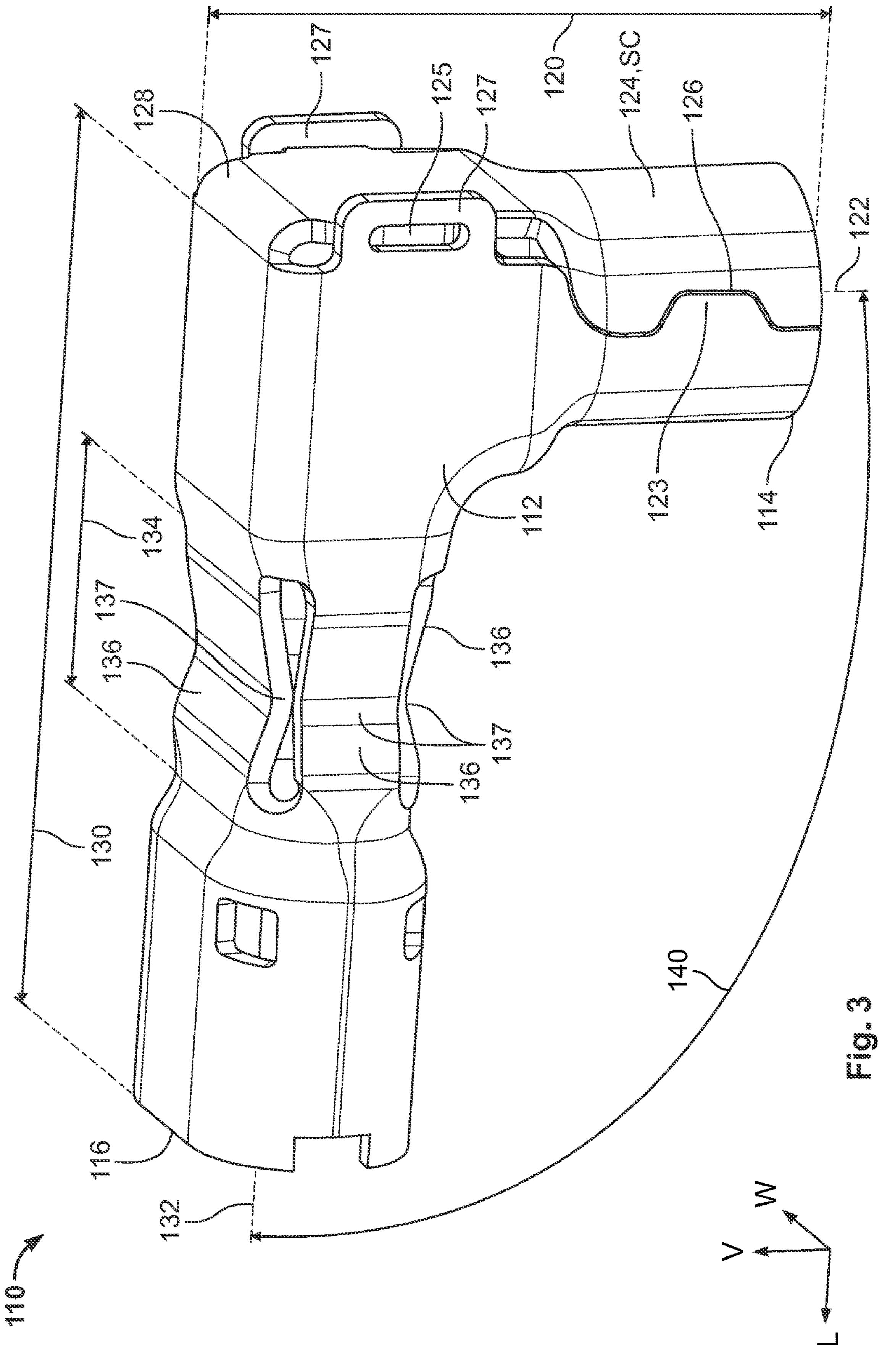
FIG. 3 is a perspective view of an angled shield of the angled connector of FIG. 1.

As shown in FIG. 3, the angled shield 110 has a shield body 112 extending from a first end 114 to an opposite second end 116. The angled shield 110 has a first shield section 120 and a second shield section 130 extending from the first shield section 120.

The first shield section 120, as shown in FIG. 3, extends from the first end 114 of the shield body 112. The first shield section 120 has a first shield axis 122 extending centrally through the first shield section 120. In the shown embodiment, the first shield axis 122 extends along a vertical direction V.

The second shield section 130 extends from the first shield section 120 to the second end 116 of the shield body 112, as shown in FIG. 3. The second shield section 120 has a second shield axis 132 extending centrally through the second shield section 120. In the shown embodiment, the second shield axis 132 extends along a longitudinal direction L perpendicular to the vertical direction V.

As shown in FIG. 3, due to the direction of extension of the second shield axis 132 with respect to the first shield axis 122, the second shield section 130 extends at a bend angle 140 with respect to the first shield section 120. In the shown embodiment, the bend angle 140 is 90° and the second shield section 130 extends perpendicularly with respect to the first shield section 120. In other embodiments, the bend angle 140 can be any angle greater than 90° and less than 180°, and the second shield section 130 can extend at angles between 90° and 180° with respect to the first shield section 120. In other embodiments, the bend angle 140 can be less than 90° or equal to 180°.

Figure 2:
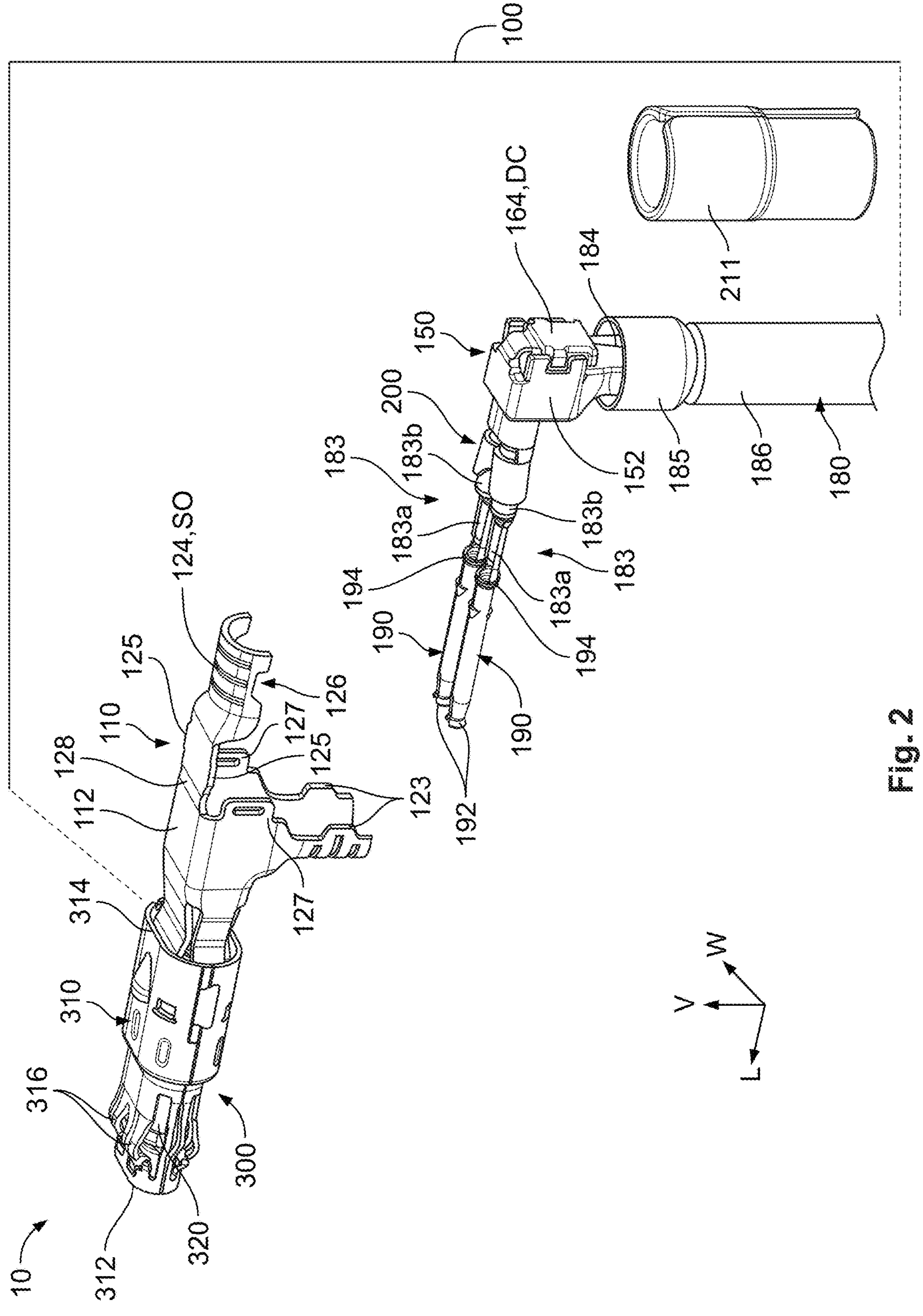
FIG. 2 is an exploded perspective view of the angled connector of FIG. 1.

In the first shield section 120, as shown in FIGS. 2 and 3, the angled shield 110 has a shield cover 124 attached to the shield body 112 at a shield hinge 128. The shield cover 124 is pivotable with respect to the shield body 112 about the shield hinge 128 between an open shield position SO, shown in FIG. 2, and a closed shield position SC, as shown in FIG. 3.

In the embodiment shown in FIGS. 2 and 3, the shield body 112 has a tab 123 in the first shield section 120 and the shield cover 124 has a recess 126 extending into the shield cover 124. When the shield cover 124 is pivoted into the closed shield position SC, as shown in FIG. 3, the tab 123 enters the recess 126 and secures the shield cover 124 in the closed shield position SC. In the shown embodiment, the shield body 112 has two tabs 123 corresponding to two recesses 126 of the shield cover 124. In other embodiments, the shield body 112 may have one or more than two tabs 123 and the shield cover 124 may have one or more than two recesses 126, provided that the number of tabs 123 is equal to the number of recesses 126.

The shield body 112, as shown in FIGS. 2 and 3, has a shield latch 127 extending from the shield body 112 in the first shield section 120. The shield cover 124 has a shield catch 125 extending from the shield cover 124. When the shield cover 124 is pivoted into the closed shield position SC, as shown in FIG. 3, the shield catch 125 engages with the shield latch 127 to secure the shield cover 124 in the closed shield position SC.

In the embodiment shown in FIGS. 2 and 3, the shield latch 127 is a tab that has an opening extending through the tab and the shield catch 125 is a protrusion that can engage with the opening; in this embodiment, the shield latch 127 elastically deflects under contact with the shield catch 125 as the shield cover 124 moves to the closed shield position SC, and elastically restores with the shield catch 125 positioned in the shield latch 127 when the shield cover 124 reaches the closed shield position SC. In other embodiments, the shield latch 127 and the shield catch 125 may be any other type of mechanical latches, such as hooks, that engage one another in the closed shield position SC. In the shown embodiment, the shield body 112 has two shield latches 127 and the shield cover 124 has two shield catches 125. In other embodiments, the shield body 112 may have one or more than two shield latches 127 and the shield cover 124 may have one or more than two shield catches 125, provided that the number of shield latches 127 is equal to the number of shield catches 125.

Figure 7:
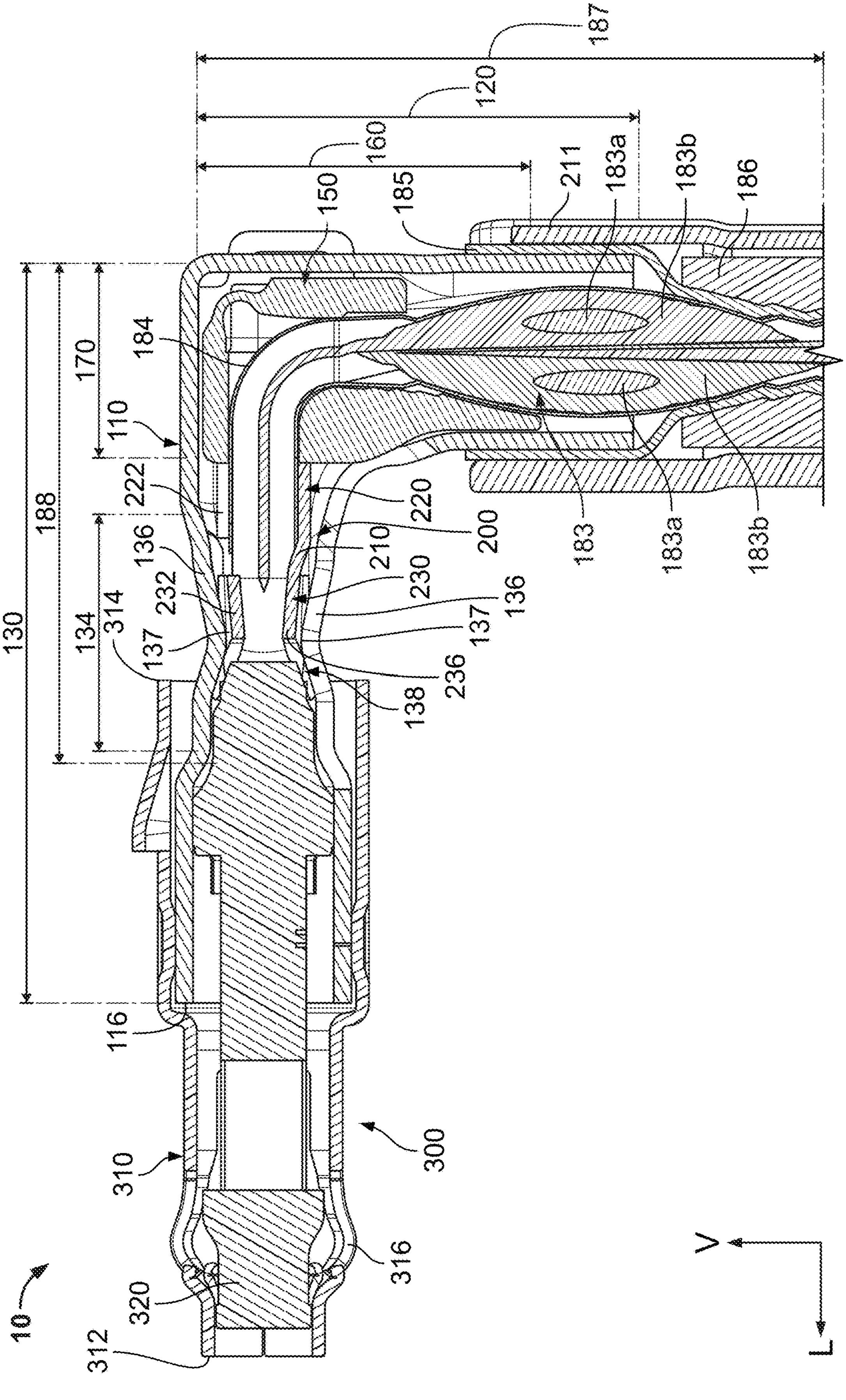
FIG. 7 is a sectional side view of the angled connector of FIG. 1.
Figure 8:
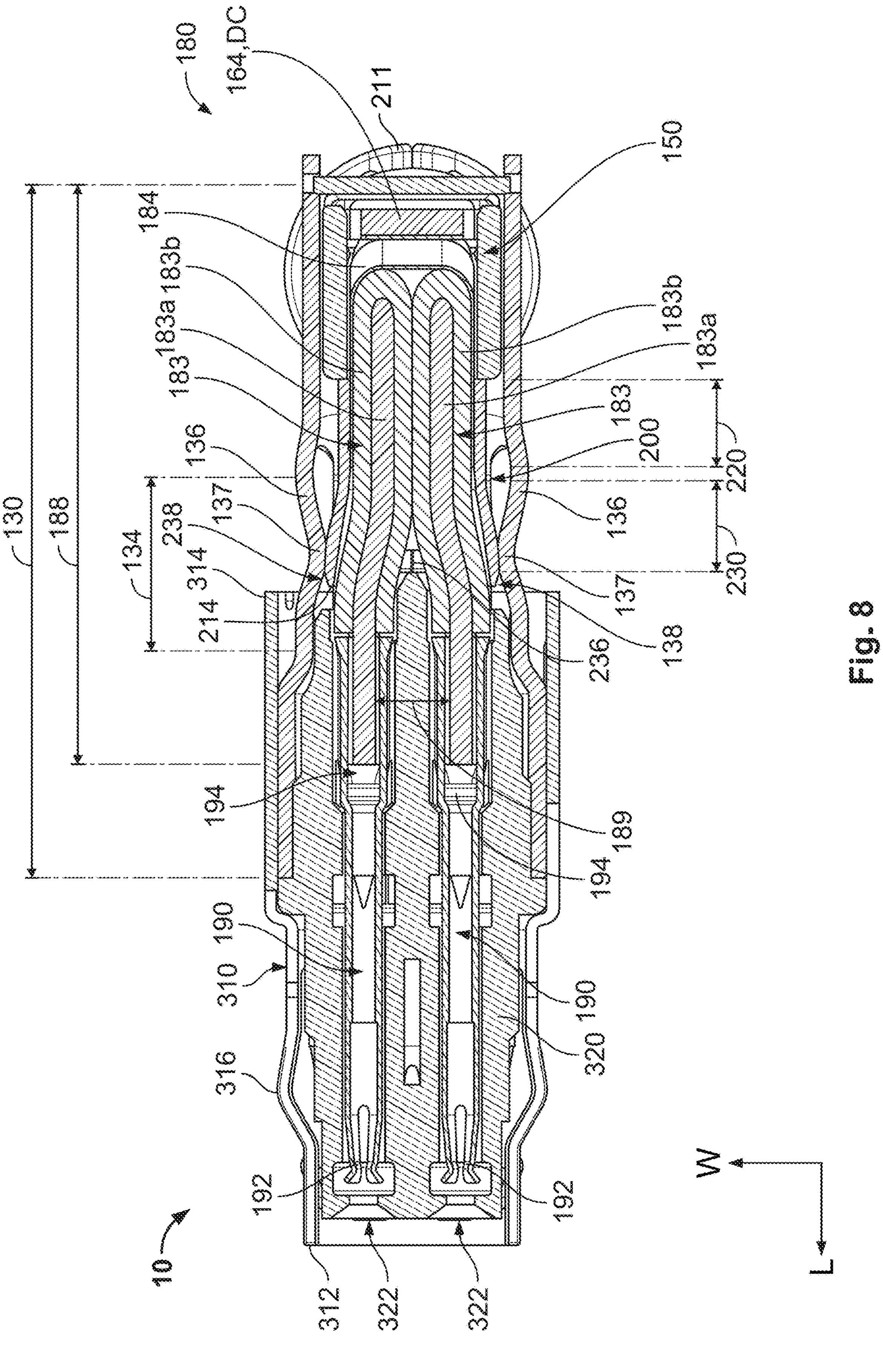
FIG. 8 is a sectional top view of the angled connector of FIG. 1.

In the second shield section 130, as shown in FIGS. 3, 7, and 8, the angled shield 110 has a transition portion 134 in which a dimension of an interior space 138 of the second shield section 130, shown in FIGS. 7 and 8, is decreased along the vertical direction V and a width direction W perpendicular to the longitudinal direction L and the vertical direction V. In the shown embodiment, the transition portion 134 is formed by a plurality of spring members 136 extending into the interior space 138 of the second shield section 130 opposite one another in the vertical direction V. In the shown embodiment, two spring members 136 are positioned opposite one another in the vertical direction V and two spring members 136 are positioned opposite one another in the width direction W. In other embodiments, the transition portion 134 may include three or less or five or more spring members 136. Each of the spring members 136 is resiliently deflectable and has a contact bend 137 at a maximum protrusion into the interior space 138.

The angled shield 110 is formed of a conductive material, such as aluminum, and in an embodiment is monolithically formed in a single piece with at least the shield body 112, the first section 120, the second section 130, and the shield cover 124. The angled shield 110 may be formed by stamping and bending from a sheet of conductive material. In other embodiments, the angled shield 110 may be formed from a plurality of separate elements attached together.

Figure 4:
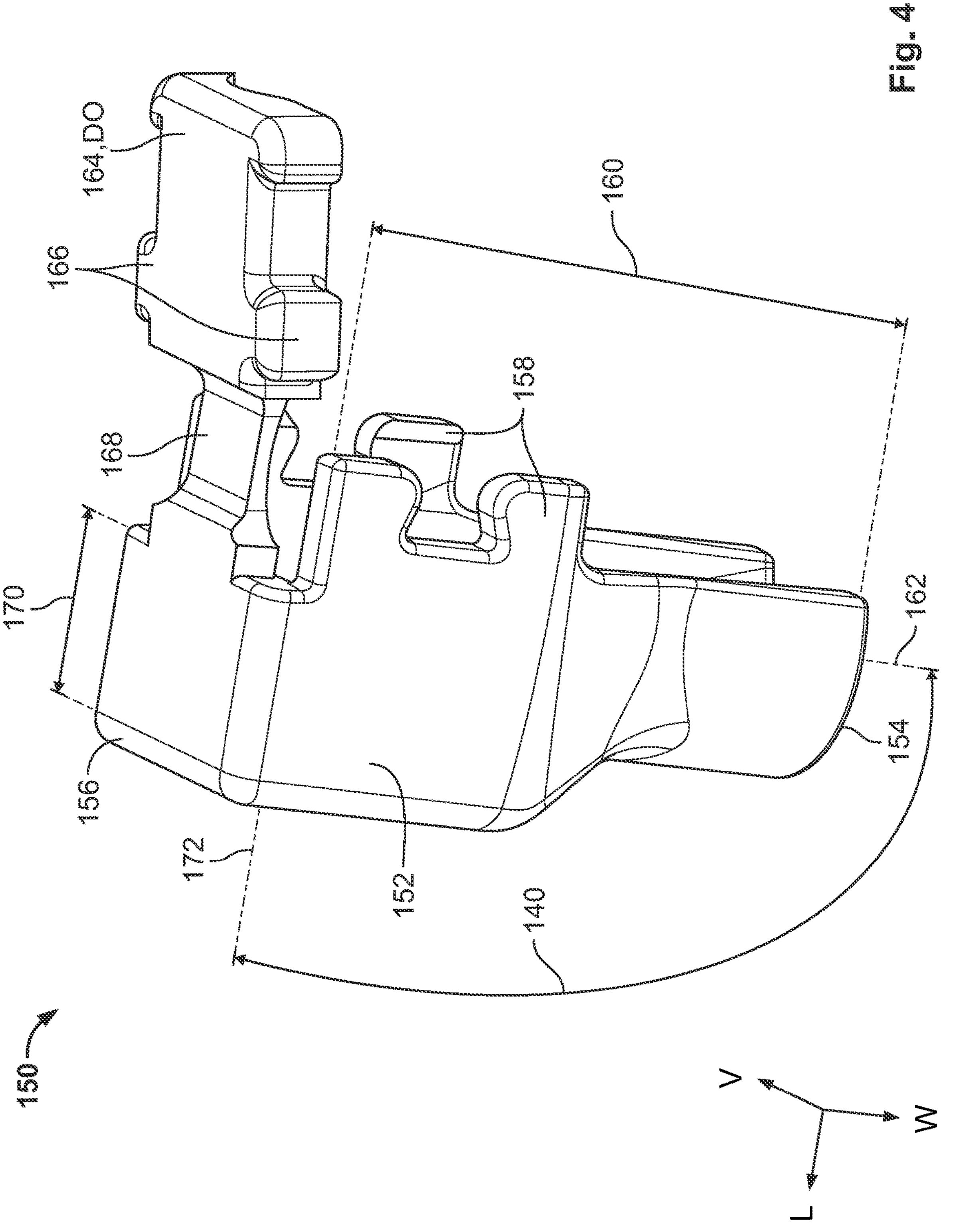
FIG. 4 is a perspective view of an angled dielectric of the angled connector of FIG. 1.

The angled dielectric 150, as shown in FIG. 4, has a dielectric body 152 extending from a first end 154 to an opposite second end 156. As shown in FIG. 4, the angled dielectric 150 has a first dielectric section 160 and a second dielectric section 170 extending from the first dielectric section 160.

The first dielectric section 160, as shown in FIG. 4, extends from the first end 154 of the dielectric body 152. The first dielectric section 160 has a first dielectric axis 162 extending centrally through the first dielectric section 160. In the shown embodiment, the first dielectric axis 162 extends along the vertical direction V.

The second dielectric section 170 extends from the first dielectric section 160 to the second end 156 of the dielectric body 152, as shown in FIG. 4. The second dielectric section 170 has a second dielectric axis 172 extending centrally through the second dielectric section 170. In the shown embodiment, the second dielectric axis 172 extends along the longitudinal direction L.

As shown in FIG. 4, due to the direction of extension of the second dielectric axis 172 with respect to the first dielectric axis 162, the second dielectric section 170 extends at the bend angle 140 with respect to the first dielectric section 160. The bend angle 140 of the second dielectric section 170 with respect to the first dielectric section 160 is the same as the bend angle 140 of the second shield section 130 with respect to the first shield section 120; the bend angle 140 of the second dielectric section 170 with respect to the first dielectric section 160 is greater than or equal to 90° and less than 180°. In another embodiment, the bend angle 140 can be less than 90° or equal to 180°.

In the first dielectric section 160, as shown in FIG. 4, the angled dielectric 150 has a dielectric cover 164 attached to the dielectric body 152 at a dielectric hinge 168. The dielectric cover 164 is pivotable with respect to the dielectric body 152 about the dielectric hinge 168 between an open dielectric position DO, shown in FIGS. 4 and 6B, and a closed dielectric position DC, shown in FIGS. 2 and 6C.

In the embodiment shown in FIG. 4, the dielectric body 152 has a dielectric catch 158 in the first dielectric section 160 and the dielectric cover 164 has a dielectric latch 166. When the dielectric cover 164 is pivoted into the closed dielectric position DC, the dielectric latch 166 engages with the dielectric catch 158 and secures the dielectric cover 164 in the closed dielectric position DC. In the shown embodiment, the dielectric catch 158 is a recess and the dielectric latch 166 is a protrusion complementary to the recess of the dielectric catch 158. In other embodiments, the dielectric catch 158 may be a protrusion and the dielectric latch 166 may be a recess complementary to the protrusion of the dielectric catch 158, or the dielectric catch 158 and the dielectric latch 166 may be any other elements capable of engaging with one another to secure the dielectric cover 164 in the closed dielectric position DC. In another embodiment, the dielectric catch 158 and the dielectric latch 166 may be omitted.

The angled dielectric 150 is a dielectric material, such as a plastic, and in an embodiment is monolithically formed in a single piece with at least the dielectric body 152, the first dielectric section 160, the second dielectric section 170, and the dielectric cover 164; in this embodiment, the dielectric hinge 168 is a film hinge. In other embodiments, the angled dielectric 150 may be formed from a plurality of separate elements attached together.

Figure 6A:
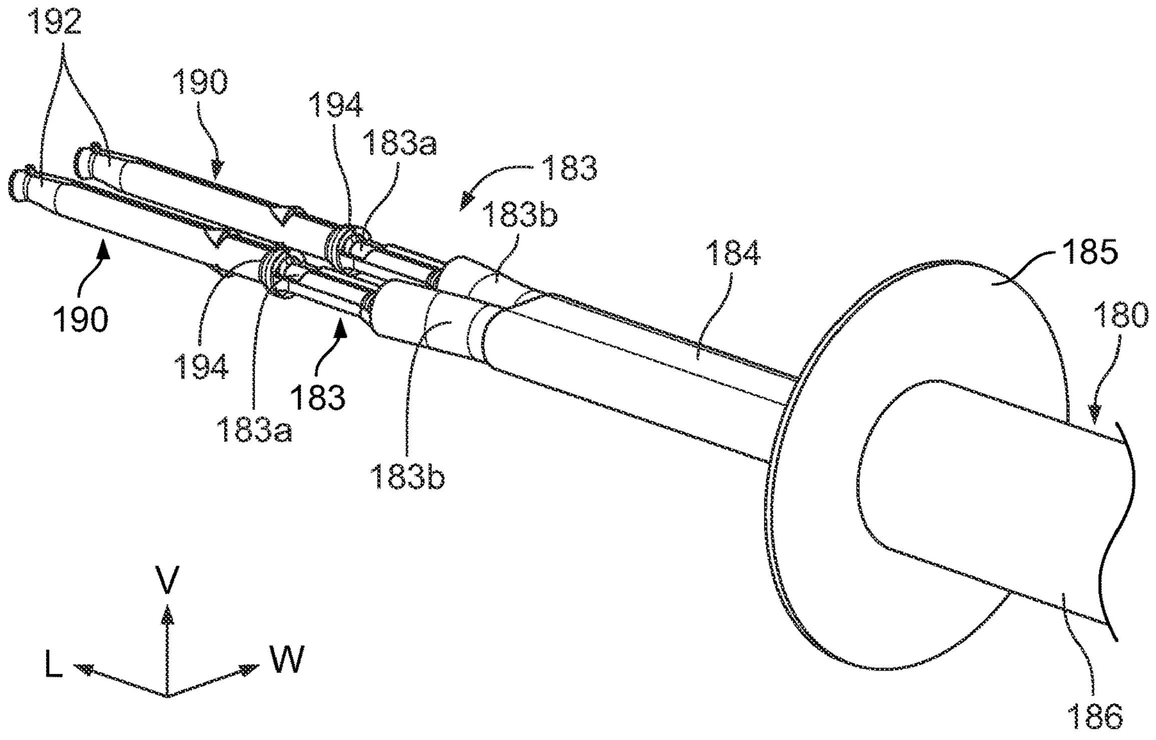
FIG. 6A is a perspective view of a cable of the angled connector of FIG. 1 connected to contacts of the angled connector.

The cable 180, as shown in FIGS. 2 and 6A, has a wire 183, a foil 184 disposed around the wire 183, a braid 185 disposed around the foil 184, and a cable insulation 186 disposed around the braid 185.

In the shown embodiment, the cable 180 includes a twisted pair of wires 183, with each of the wires 183 having a conductor **183*a* and a wire insulation 183*b* disposed around the conductor 183*a*. In the twisted pair embodiment, the wires 183 are twisted around one another within the foil 184 with the wire insulation 183*b* of each of the wires 183 in abutment with one another. In another embodiment, the cable 180 includes a pair of wires 183 extending parallel to one another, each of the wires 183 having the conductor 183*a* and the wire insulation 183*b*. In another embodiment, the cable 180 may have one wire 183 with one conductor 183*a* surrounded by one wire insulation 183*b***.

The foil 184 is disposed around the wires 183 or wire 183 in abutment with the wire insulation **183*b*, as shown in FIGS. 2 and 6A. The foil 184 is formed of a conductive material. The braid 185 is disposed around and in abutment with the foil 184; the braid 185 is formed of a conductive material. The cable insulation 186, formed of an insulative material, is disposed around and in abutment with the braid 185**.

The contact 190, as shown in FIGS. 2 and 6A, has a mating portion 192 and a connection portion 194 at an end opposite the mating portion 192. The contact 190 is formed of a conductive material. In the shown embodiment, the mating portion 192 is a receptacle for a pin; in other embodiments, the mating portion 192 could be a pin or any other type of contact element capable of mating with another contact element. In the shown embodiment, the connection portion 194 is a crimping portion capable of being crimped to a conductor. In other embodiments, the connection portion 194 could be a flat element capable of being welded to a conductor, or any other type of element capable of mechanically and electrically connecting the contact 190 to a conductor. The angled subassembly 100 has two contacts 190 in the shown embodiment. The number of contacts 190 corresponds to the number of wires 183 of the cable 180; the angled subassembly 100 may alternatively have one contact 190 for an embodiment of the cable 180 having one wire 183.

Figure 5:
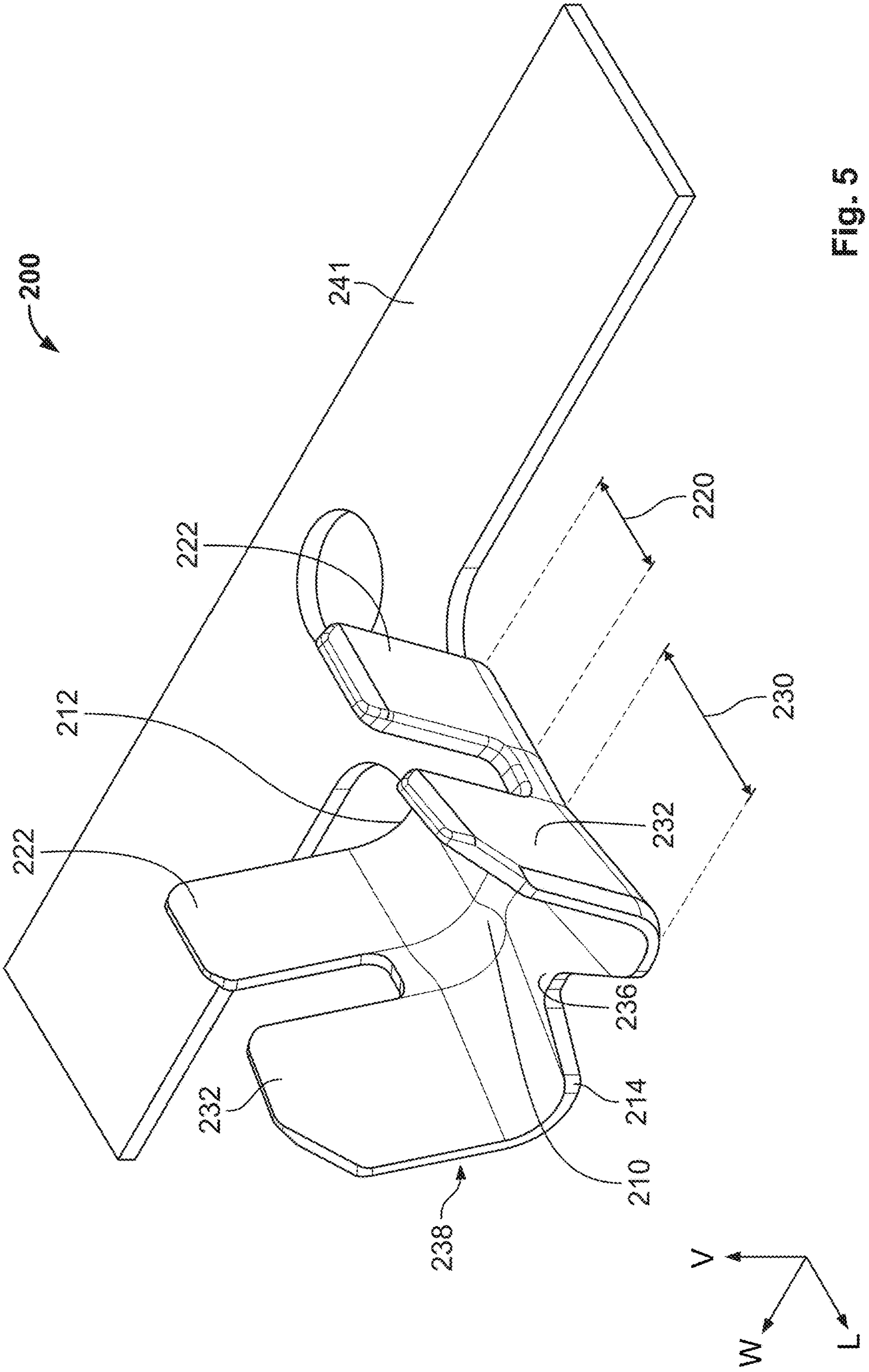
FIG. 5 is a perspective view of an inner ferrule of the angled connector of FIG. 1.

The inner ferrule 200, as shown in FIG. 5, has a base 210 extending from a first end 212 to a second end 214 along the longitudinal direction L. The inner ferrule 200 has a first crimp section 220 at the first end 212 and a second crimp section 230 at the second end 214; the second crimp section 230 is connected to the first crimp section 220 by the base 210. The first crimp section 220 has a pair of first crimp wings 222 extending from the base 210 and positioned opposite one another in the width direction W. The second crimp section 220 has a pair of second crimp wings 232 extending from the base 210 and positioned opposite one another in the width direction W.

In the second crimp section 230, as shown in FIG. 5, the base 210 has a fan protrusion 236 extending in the vertical direction V at least partially between the second crimp wings 232. The fan protrusion 236 has an approximately triangular shape, with a narrower portion on the base 210 adjacent to the first crimp section 220 and a wider portion at the second end 214 of the base 210. The fan protrusion 236 and the second crimp wings 232 form a flared shape 238 of the second crimp section 230 opening toward the second end 214 of the base 210. In another embodiment, the fan protrusion 236 can be omitted, and the second crimp section 230 can extend straight from the first crimp section 220 along the longitudinal direction L.

In the embodiment shown in FIG. 5, the first end 212 of the base 210 is connected to a carrier strip 241. A plurality of inner ferrules 200 can be connected to the carrier strip 241 to move the inner ferrules 200 during production or for other applications and, prior to use of the inner ferrule 200 as described below, the inner ferrule 200 is separated from the carrier strip 241 at the first end 212 of the base 210.

The inner ferrule 200 is formed of a conductive material, such as aluminum or copper, and in an embodiment is monolithically formed in a single piece with at least the base 210, the first crimp section 220, and the second crimp section 230. In the shown embodiment, the inner ferrule 200 is also monolithically formed with the carrier strip 241 prior to separation from the carrier strip 241. The inner ferrule 200 may be formed by stamping and bending from a sheet of conductive material. In other embodiments, the inner ferrule 200 may be formed from a plurality of separate elements attached together. In another embodiment, the inner ferrule 200 may have a plurality of first crimp sections 220 and a plurality of second crimp sections 230 to connect to a plurality of wires.

The outer ferrule 211, as shown in the embodiment of FIGS. 1 and 2, is an approximately cylindrical element formed of a conductive material. In an embodiment, the outer ferrule 211 is formed from bending or rolling a sheet of conductive material.

The mating subassembly 300, as shown in FIGS. 1 and 2, includes a mating shield 310 and a mating dielectric 320 disposed within the mating shield 310. The mating shield 310, formed of a conductive material, extends from a first end 312 to an opposite second end 314 along the longitudinal direction L. The mating shield 310 has a plurality of contact springs 316 disposed adjacent to the first end 312. In an embodiment, the mating shield 310 is monolithically formed in a single piece. The mating dielectric 320 is formed of a dielectric material and, as shown in FIG. 8, has a plurality of contact receiving passageways 322 extending through the mating dielectric 320 along the longitudinal direction L. The mating dielectric 320 can alternatively have one or more than two contact receiving passageways 322; the number of contact receiving passageways 322 corresponds to the number of wires 183 of the cable 180 and the number of contacts 190.

The assembly of the angled connector 10 will now be described primarily with respect to FIGS. 6A-6F.

In a first step, shown in FIG. 6A, the cable insulation 186, the braid 185, and the foil 184 are stripped to expose the wires 183. For each of the wires 183, a portion of the wire insulation 183*b* is stripped to expose a portion of the conductor 183*a*. The connection portion 194 of each of the contacts 190 is electrically and mechanically connected to one of the exposed conductors 183*a*. In the embodiment shown in FIG. 6A, the connections portions 194 are crimped to the conductors 183*a*.

Figure 6B:
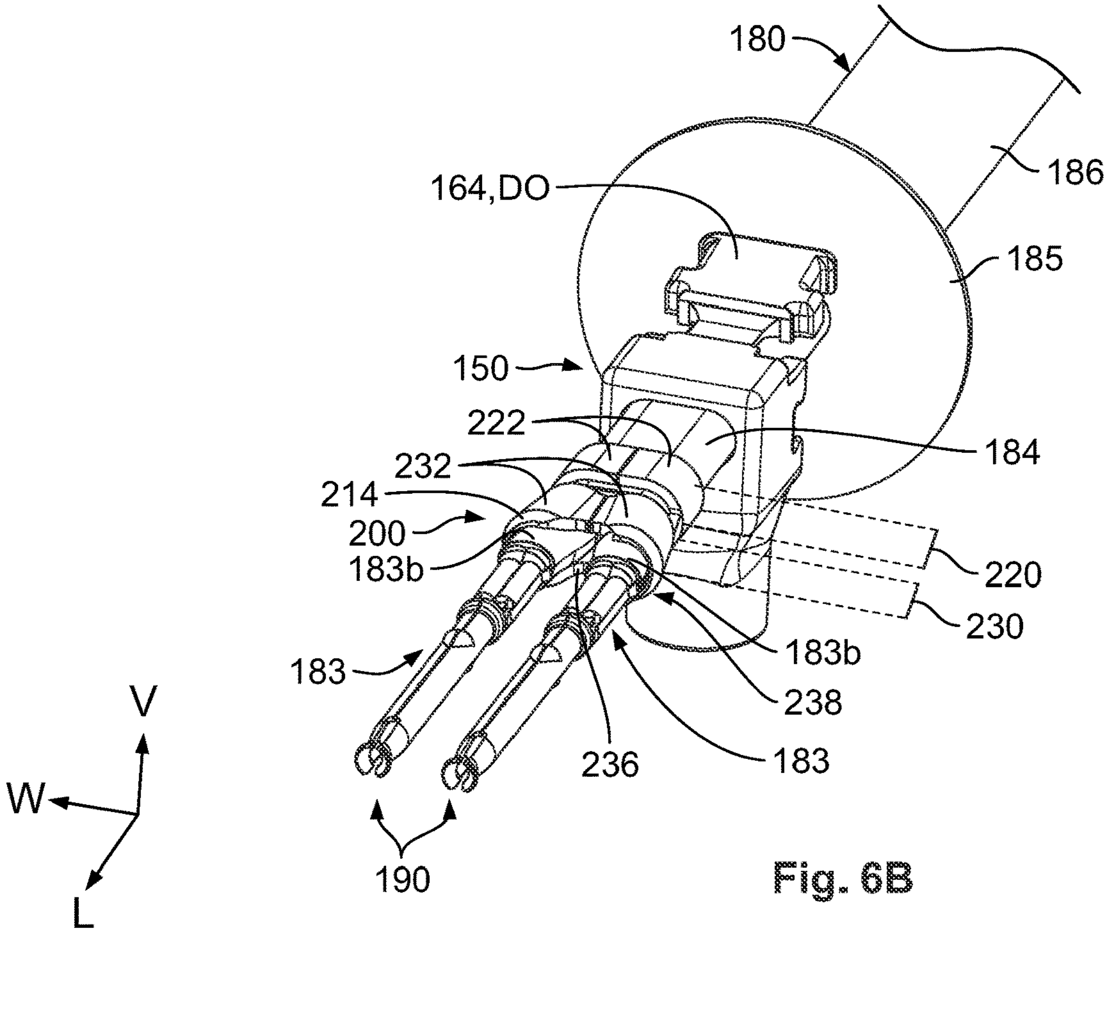
FIG. 6B is a perspective view of the cable, the angled dielectric, and the inner ferrule of the angled connector of FIG. 1 with a dielectric cover of the angled dielectric in an open dielectric position.

In a next step, shown in FIG. 6B, the cable 180 is inserted into and through the angled dielectric 150 with the dielectric cover 164 in the open dielectric position DO. In the step shown in FIG. 6B, the cable 180 extends though the angled dielectric 150 along the second dielectric axis 172 shown in FIG. 4.

The inner ferrule 200, in the step shown in FIG. 6B, is moved into a position in which it is disposed around the cable 180. The first crimp section 220 is disposed around the foil 184 and the wires 183 and the first crimp wings 222 are crimped around the foil 184 and the wires 183. The first crimp wings 222 in the first crimp section 220 press the foil 184 against the wires 183 to hold the foil 184 in place and electrically connect the inner ferrule 200 to the foil 184. The second crimp section 230 is disposed around the wires 183 and the second crimp wings 232 are crimped around the wires 183. The crimped second crimp wings 232 and the fan protrusion 236 are positioned at least partially between the wires 183 in the width direction W. The second crimp wings 232 press against the wire insulation 183*b* of the wires 183 and, with the fan protrusion 236, form the flared shape 238. The wires 183, as shown in FIG. 8, are positioned adjacent to one another in the first crimp section 220, and the flared shape 238 holds the wires 183 at a pitch 189 separated from one another at the second end 214 of the inner ferrule 200. In another embodiment, the second crimp wings 232 and the fan protrusion 236 could position the wires 183 parallel to each other through all of the second crimp section 230 and the wires 183 could transition outwards to the pitch 189 prior to reaching the second crimp section 230 along the longitudinal direction L, in the space between the first crimp section 220 and the second crimp section 230. The pitch 189 is predetermined and is chosen for optimal impedance control.

Figure 6C:
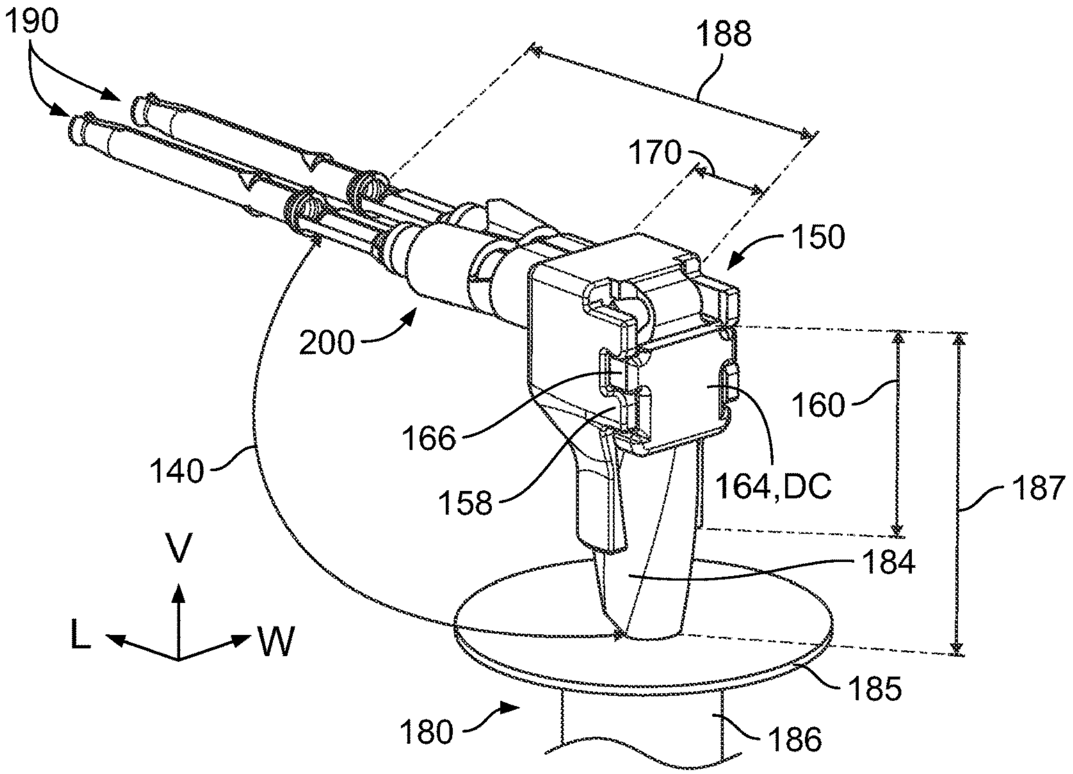
FIG. 6C is a perspective view of the cable and the angled dielectric of FIG. 6B with the dielectric cover in a closed dielectric position.

In a next step, shown in FIG. 6C, the cable 180 is bent within the angled dielectric 150. When the cable 180 is bent, the cable 180 has a first portion 187 and a second portion 188 extending at the bend angle 140 with respect to the first portion 187. The first portion 187 is disposed in the first dielectric section 160 and the second portion 188 is disposed in the second dielectric section 170. As shown in FIG. 6C, the inner ferrule 200 is disposed adjacent to the second dielectric section 170.

With the cable 180 fully inserted through the angled dielectric 150 and bent into the shape described above and shown in FIG. 6C, the dielectric cover 164 is moved from the open dielectric position DO to the closed dielectric position DC shown in FIG. 6C. In an embodiment, the dielectric catch 158 engages the dielectric latch 166 to secure the dielectric cover 164 in the closed dielectric position DC. In another embodiment, in lieu of or in addition to the dielectric catch 158 and the dielectric latch 166, the dielectric cover 164 is secured to the dielectric body 152 in the closed dielectric position DC by plastic welding of the dielectric cover 164 to the dielectric body 152. In another embodiment, the angled dielectric 150 does not have the dielectric cover 164 pivotable with respect to the dielectric body 152, but rather is overmolded in a single piece over the foil 184 of the cable 180 in the position shown in FIG. 6C.

The angled dielectric 150 in the position shown in FIG. 6C, due to the structure and the bend angle 140 of the first dielectric section 160 with respect to the second dielectric section 170, secures the cable 180 in the position shown in FIG. 6C with the first portion 187 at the same bend angle 140 with respect to the second portion 188. In the shown embodiment, the cable 180 is inserted into the angled dielectric 150 to be bent and held with the contacts 190 already connected to the wires 183, and the inner ferrule 200 is crimped to the cable 180 after the cable 180 is inserted through the angled dielectric 150. In another embodiment, the cable 180 can be inserted into the angled dielectric 150, bent, and held by the angled dielectric 150 prior to connecting the contacts 190 with the wires 183.

Figure 6D:
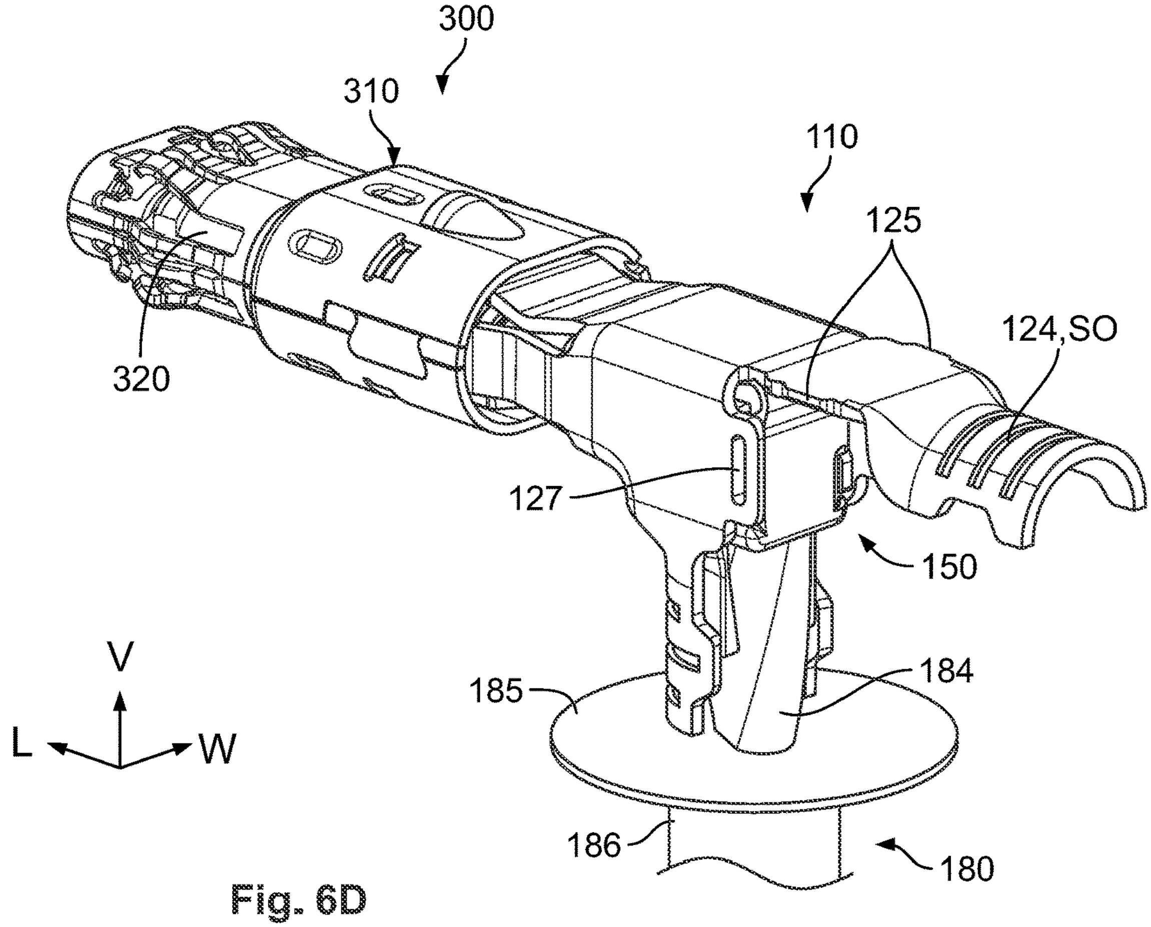
FIG. 6D is a perspective view of the cable with the angled dielectric in the angled shield of FIG. 3, with a shield cover of the angled shield in an open shield position.

In a step shown in FIG. 6D, the cable 180 bent and held by the angled dielectric 150 is inserted into the angled shield 110 with the shield cover 124 in the open shield position SO. In the position shown in FIG. 6D, the braid 185 is flared outwards from the cable 180.

Figure 6E:
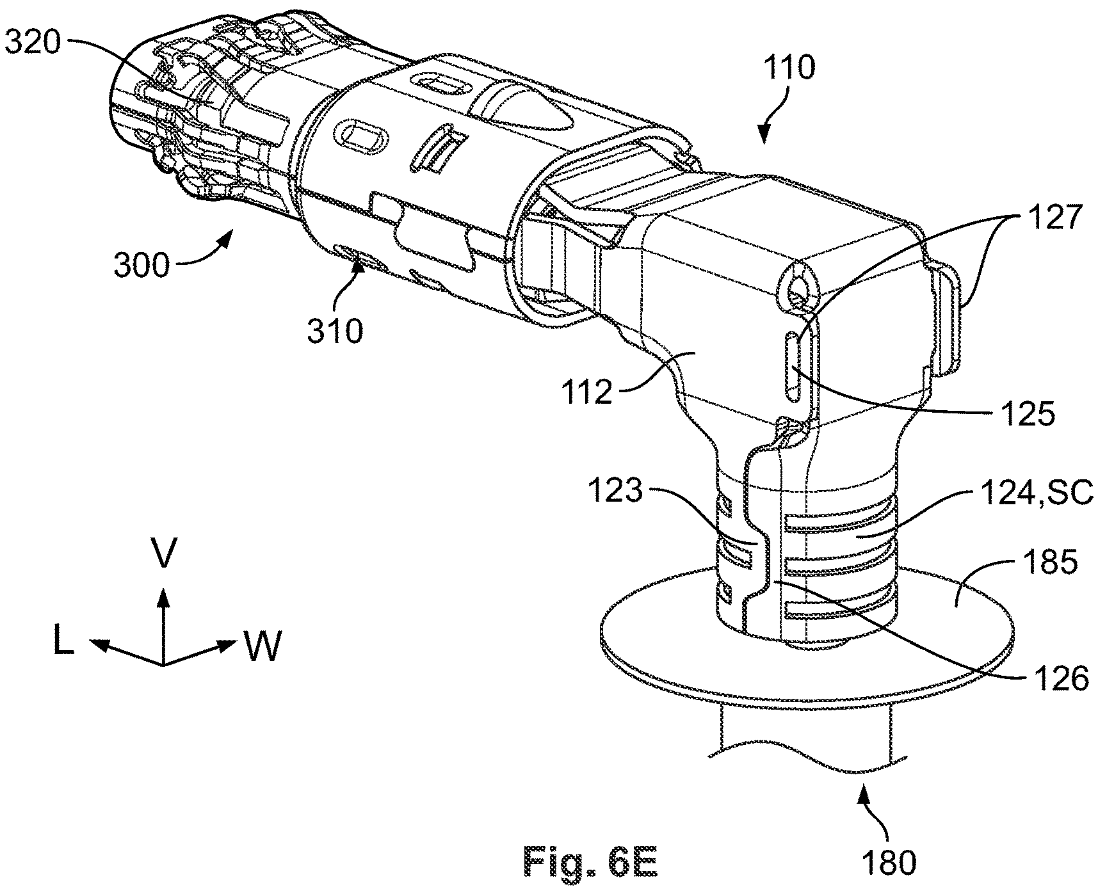
FIG. 6E is a perspective view of the cable in the angled shield of FIG. 6D with the shield cover in a closed shield position.

The shield cover 124 is then moved from the open shield position SO shown in FIG. 6D to the closed shield position SC shown in FIG. 6E, enclosing the cable 180 in the shield body 112. In the shown embodiment, the tab 123 is disposed in the recess 126 to secure the shield cover 124 in the closed shield position SC. As shown in FIG. 3 and described above, the shield catch 125 engages with the shield latch 127 to secure the shield cover 124 in the closed shield position SC. In other embodiments, including the tab 123 and the recess 126 or omitting the tab 123 and the recess 126, and in addition to or in lieu of engagement of the shield catch 125 with the shield latch 127, the shield cover 124 can be welded or joined by forming to the shield body 112 to secure the shield cover 124 in the closed shield position SC.

Figure 6F:
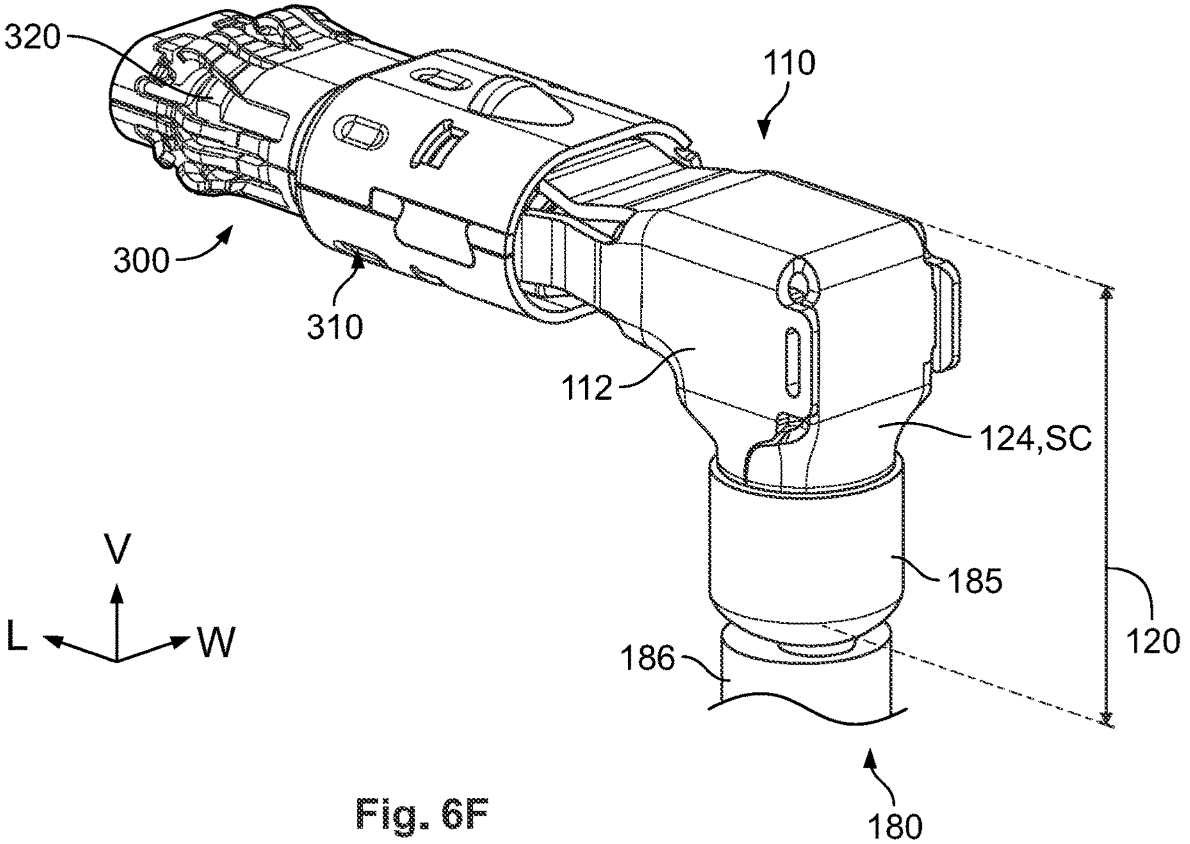
FIG. 6F is a perspective view of the cable in the angled shield with the shield cover in the closed shield position of FIG. 6E and with a braid of the cable disposed over a first shield section of the angled shield.

With the shield cover 124 in the closed shield position SC shown in FIG. 6E, the braid 185 is dressed or folded over the first shield section 120 of the angled shield 110, as shown in FIG. 6F. The outer ferrule 211 is then positioned over the exposed portion of the braid 185 and a portion of the cable insulation 186 and crimped over the braid 185, the first shield section 120, and the cable insulation 186, as shown in FIGS. 1 and 7.

In the embodiment shown in FIGS. 6D-6F, the mating subassembly 300 is already connected to the angled shield 110 when the angled dielectric 150 and the cable 180 are inserted into the angled shield 110. As shown in FIGS. 7 and 8, the second end 116 of the angled shield 110 at the second shield section 130 is inserted into the second end 314 of the mating shield 310 and disposed in the mating shield 310. The angled shield 110 is mechanically and electrically connected to the mating shield 310 through the second shield section 130. The mating dielectric 320 is disposed within the interior space 138 of the second shield section 130, as shown in FIGS. 7 and 8. The mating dielectric 320 extends from a position adjacent to the transition portion 134 and out of the second shield section 130 along the longitudinal direction L. In another embodiment, the mating subassembly 300 can be connected to the angled shield 110 after the angled dielectric 150 and the cable 180 are inserted into the angled shield 110.

The angled connector 10 is shown in a fully assembled state in FIGS. 1, 7, and 8 in which the cable 180 is disposed and held within the angled shield 110 and the angled dielectric 150.

As shown in FIG. 7, the first portion 187 of the cable 180 is positioned in the first shield section 120 of the angled shield 110 and in the first dielectric section 160 of the angled dielectric 150. The foil 184 is disposed around the wires 183 in the first portion 187 and is held in abutment against the wire insulation 183*b* of the wires 183. The braid 185 in the first portion 187 is crimped to the first shield section 120 by the outer ferrule 211 and is disposed between the first shield section 120 and the outer ferrule 211; in an embodiment, the first shield section 120 provides a support for crimping of the outer ferrule 211 around the braid 185 and the cable 180 that prevents the crimping of the outer ferrule 211 from damaging the foil 194 or the wires 183.

The second portion 188 of the cable 180, as shown in FIGS. 7 and 8, is positioned in the second shield section 130 of the angled shield 110 and in the second dielectric section 170 of the angled dielectric 150. The foil 184 is disposed around the wires 183 in the second portion 188 and is held in abutment against the wire insulation 183*b* of the wires 183 by the first crimp section 220 of the inner ferrule 200. The first crimp section 220 and the second crimp section 230 are disposed in the second shield section 130. The wires 183 and the foil 184 are each disposed in the first portion 187 and the second portion 188 of the cable 180.

The first crimp section 220 of the inner ferrule 200 is electrically and mechanically connected to the foil 184 by the crimping of the first crimp wings 222. As shown in FIGS. 7 and 8, when the cable 180 with the inner ferrule 200 crimped to the cable 180 is positioned within the interior space 138 of the second shield section 130, the spring members 136 extending into the interior space 138 contact the inner ferrule 200. The contact bend 137 of each of the spring members 136 contacts the second crimp section 230 of the inner ferrule 200 and the spring members 136 resiliently deflect to apply a pressure maintaining a contact of the spring members 136 with the second crimp section 230. The spring members 136 form and maintain an electrical connection between the angled shield 110 and the inner ferrule 200. The inner ferrule 200 electrically connects the angled shield 110 to the foil 184 through the crimping of the first crimp section 220.

As shown in FIG. 8, each of the contacts 190 is positioned and held in one of the contact receiving passageways 322 of the mating dielectric 320, within the second shield section 130 of the angled shield 110. The conductors 183*a* of the wires 183 electrically and mechanically connected to the connection portions 194 of the contacts 190 are disposed within the mating dielectric 320 and the mating portions 192 of the contacts 190 opposite the connection portions 194 are disposed adjacent to the first end 312 of the mating shield 310.

In the fully assembled state shown in FIGS. 1, 7, and 8, the foil 184 of the cable 180, the angled shield 110, the braid 185, the inner ferrule 200, the outer ferrule 211, and the mating shield 310 are electrically connected. The conductors 183*a* of the wires 183 are electrically connected to the contacts 190 and are electrically isolated from the foil 184, the angled shield 110, the braid 185, the inner ferrule 200, and the mating shield 310 by the wire insulations 183*b* and the mating dielectric 320. When the angled connector 10 is connected with a mating connector, the contact springs 316 of the mating shield 310 resiliently abut and electrically connect with a shield of the mating connector, and the contacts 190 mate and electrically connect with contacts of the mating connector.

In the angled connector 10, the cable 180 extends through a bend with the first portion 187 held at the bend angle 140 with respect to the second portion 188 by the angled shield 110 and the angled dielectric 150. By having the bend in the cable 180 itself, the foil 184 can remain over a longer portion of the cable 180 in the angled connector 10, allowing for a high degree of impedance control and improved shielding performance. The first crimp section 220 of the inner ferrule 200 crimped over the foil 184 maintains a tight fit of the wire or wires 183 within the angled shield 110 and a tight wrap of the foil 184 around the wires 183 in the second portion 188. The contact of the second crimp section 230 with the angled shield 110 at the spring members 136 forms a reliable electrical connection between the angled shield 110 and the foil 184 through the inner ferrule 200, further aiding in the high degree of impedance control and improved shielding performance.

The foil 184 extending over a large portion of the cable 180 and through the bend also avoids the crimping of the outer ferrule 211 having a significant impact on the impedance control; the outer ferrule 211 can be crimped as tight as necessary for mechanical robustness and, as described above, can bear on the first shield section 120 instead of potentially damaging the foil 184. Simple designs of the contact 190 can be used with the angled connector 10, saving on component cost and decreasing the complexity of assembly.

In the shown embodiment, the angled dielectric 150 maintains a tight fit of the wire or wires 183 within the angled shield 110 and a tight wrap of the foil 184 around the wires 183 in the first portion 187 and the second portion 188. In another embodiment, the angled dielectric 150 can be omitted. In an embodiment omitting the angled dielectric 150, the other elements of the angled connector 10 are still arranged as described above; the cable 180 extends through the angled shield 110 with the first portion 187 and the second portion 188 still at the bend angle 140, and the inner ferrule 200 is relied upon to maintain the tightness of the wires 183 with each other and the tight wrap of the foil 184.

The angled connector 10 in the shown embodiment holds the first portion 187 of the cable 180 with respect to the second portion 188 of the cable 180 on the opposite side of the bend at the bend angle 140 of 90°. In other embodiments, the bend angle 140 can be any angle greater than 90° and less than 180°, or any angle less than 90° or equal to 180°. The cable 180 in the shown embodiment also has a particular rotational position with respect to the contacts 190 about a rotational axis of the longitudinal direction L. The angled connector 10 is not limited to the rotational position of the shown embodiment, and the cable 180 could be arranged and held by the angled subassembly 100 at any rotational position about the longitudinal axis L with respect to the contacts 190.

Figure 9:
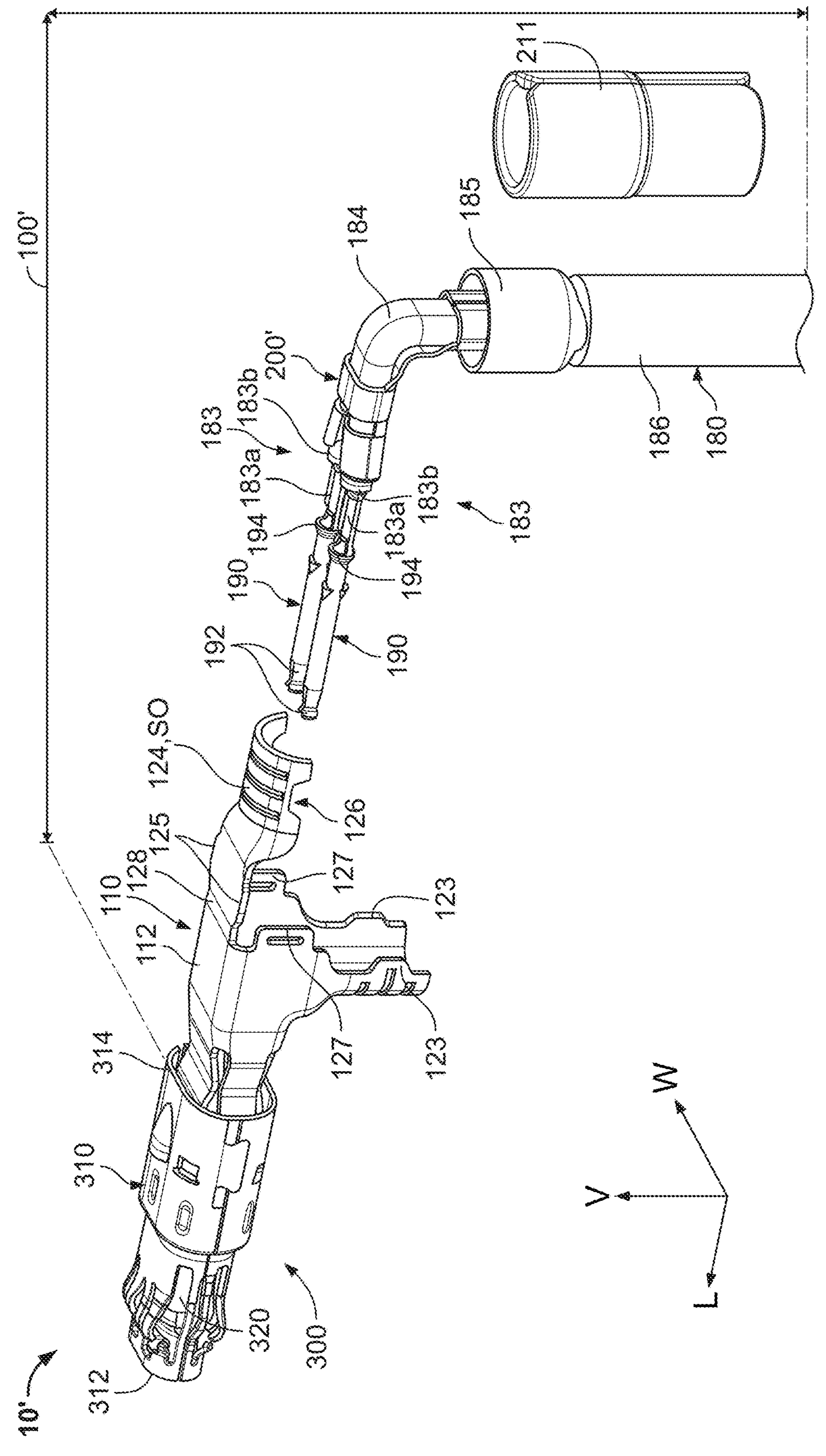
FIG. 9 is an exploded perspective view of an angled connector according to another embodiment.

An angled connector 10' according to another embodiment, as shown in FIG. 9, includes an angled subassembly 100' and a mating subassembly 300 connected to the angled subassembly 100'. Like reference numbers refer to like elements with the embodiment of the angled connector 10 described above with respect to FIGS. 1-8, and primarily the differences of the embodiment of the angled connector 10' will be described herein with reference to FIGS. 9-13.

In the angled subassembly 100', as shown in FIG. 9, the angled shield 110, the cable 180, the contact 190, and the outer ferrule 211 are the same as shown and described in detail above with respect to the angled subassembly 100 of FIGS. 1-8. The angled dielectric 150 is omitted in the embodiment of the angled subassembly 100' and the differences of an inner ferrule 200' of the angled subassembly 100' will be described in greater detail below.

Figure 10:
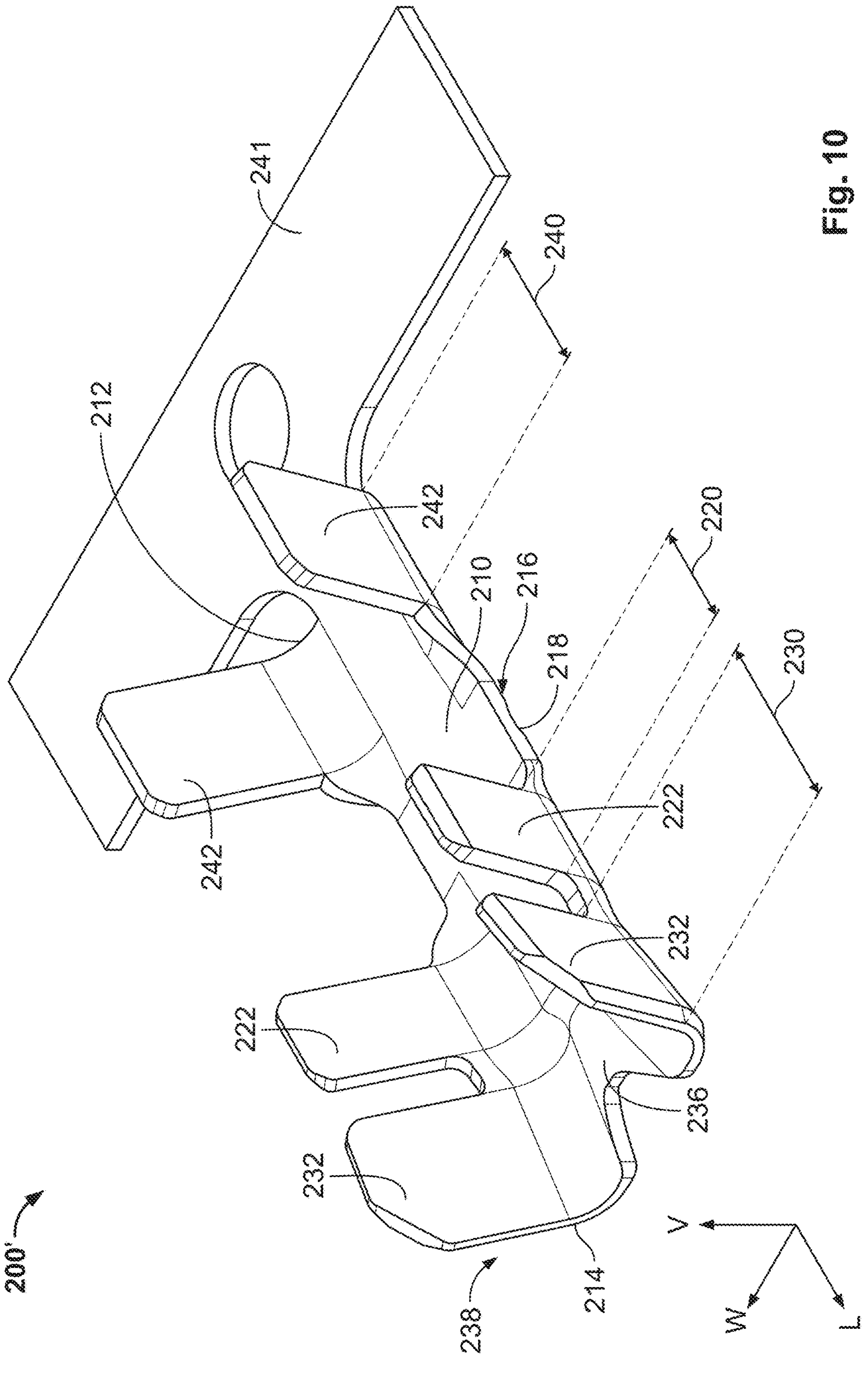
FIG. 10 is a perspective view of an inner ferrule of the angled connector of FIG. 9.

The inner ferrule 200', as shown in FIG. 10, has a base 210 extending from a first end 212 to a second end 214 along the longitudinal direction L. The inner ferrule 200' has a third crimp section 240 at the first end 212, a second crimp section 230 at the second end 214, and a first crimp section 220 between the third crimp section 240 and the second crimp section 230; the third crimp section 240 is connected to the first crimp section 220 and the second crimp section 230 by the base 210. The first crimp section 220 has a pair of first crimp wings 222 extending from the base 210 and positioned opposite one another in the width direction W. The second crimp section 220 has a pair of second crimp wings 232 extending from the base 210 and positioned opposite one another in the width direction W. The third crimp section 240 has a pair of third crimp wings 242 extending from the base 210 and positioned opposite one another in the width direction W.

As shown in FIG. 10, the third crimp section 240 is separated from the first crimp section 220 and the second crimp section 230 by a bend region 216 of the base 210. The bend region 216 has a weakening element 218 that lessens a force required to bend the bend region 216. In the shown embodiment, the weakening element 218 is a thinning of the material of the base 210 in the vertical direction V; the thinning can be accomplished by removal of material of the base 210 or by formation of the weakening element 218 with the thinner dimension. In other embodiments, the weakening element 218 can be any other structure, such as variously arranged openings in the base 210, that lessen the force required to bend the bend region 216. The weakening element 218 could also be omitted if the bend region 216 can be adequately bent without a weakening element.

As similarly described in the embodiment of FIG. 5, in the second crimp section 230, as shown in FIG. 10, the base 210 has a fan protrusion 236 extending in the vertical direction V at least partially between the second crimp wings 232. The fan protrusion 236 has an approximately triangular shape, with a narrower portion on the base 210 adjacent to the first crimp section 220 and a wider portion at the second end 214 of the base 210. The fan protrusion 236 and the second crimp wings 232 form a flared shape 238 of the second crimp section 230 opening toward the second end 214 of the base 210. In another embodiment, the second crimp wings 232 and the fan protrusion 236 could position the wires 183 parallel to each other through all of the second crimp section 230 and the wires 183 could transition outwards to the pitch 189 prior to reaching the second crimp section 230 along the longitudinal direction L, in the space between the first crimp section 220 and the second crimp section 230.

In the embodiment shown in FIG. 10, the first end 212 of the base 210 is connected to a carrier strip 241. A plurality of inner ferrules 200' can be connected to the carrier strip 241 to move the inner ferrules 200' during production or for other applications and, prior to use of the inner ferrule 200' as described below, the inner ferrule 200' is separated from the carrier strip 241 at the first end 212 of the base 210.

The inner ferrule 200' is formed of a conductive material, such as aluminum or copper, and in an embodiment is monolithically formed in a single piece with at least the base 210, the first crimp section 220, the second crimp section 230, and the third crimp section 241. In the shown embodiment, the inner ferrule 200' is also monolithically formed with the carrier strip 241 prior to separation from the carrier strip 241. The inner ferrule 200' may be formed by stamping and bending from a sheet of conductive material. In other embodiments, the inner ferrule 200' may be formed from a plurality of separate elements attached together.

The assembly of the angled connector 10' will now be described primarily with respect to FIGS. 11A-11C. Only the differences from the assembly shown and described in FIGS. 6A-6F will be described in detail herein.

Figure 11A:
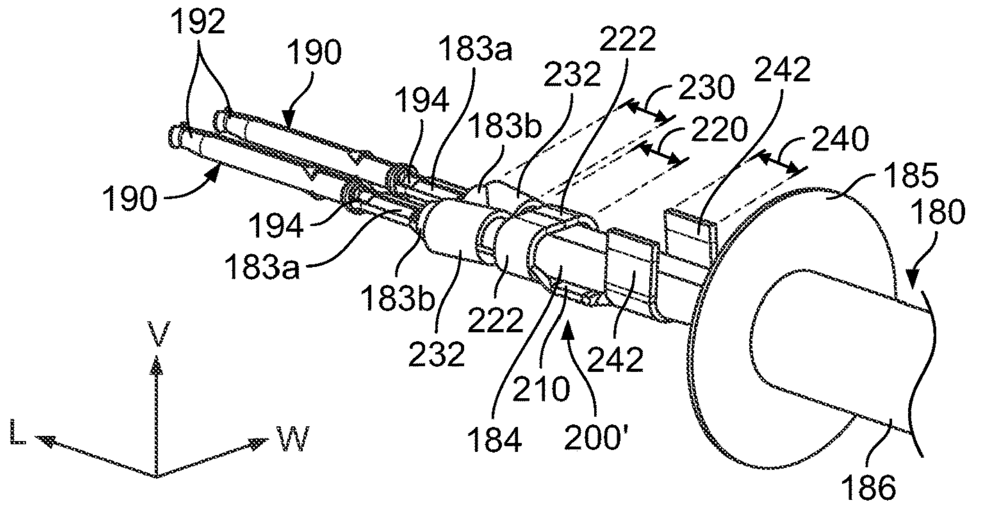
FIG. 11A is a perspective view of a cable and the inner ferrule of the angled connector of FIG. 9.

Following the step shown in FIG. 6A, the inner ferrule 200' is moved into a position in which it is disposed around the cable 180, as shown in FIG. 11A. The first crimp section 220 and the second crimp section 230 are positioned on the cable 180 and crimped as described above with respect to FIG. 6B. The third crimp section 140 is disposed around the foil 184 and the wires 183 at a position spaced apart from the first crimp section 220 and the second crimp section 230 along the longitudinal direction L. In the state shown in FIG. 11A, the first crimp section 220 and the second crimp section 230 are crimped, while the third crimp wings 242 of the third crimp section 240 remain uncrimped.

Figure 11B:
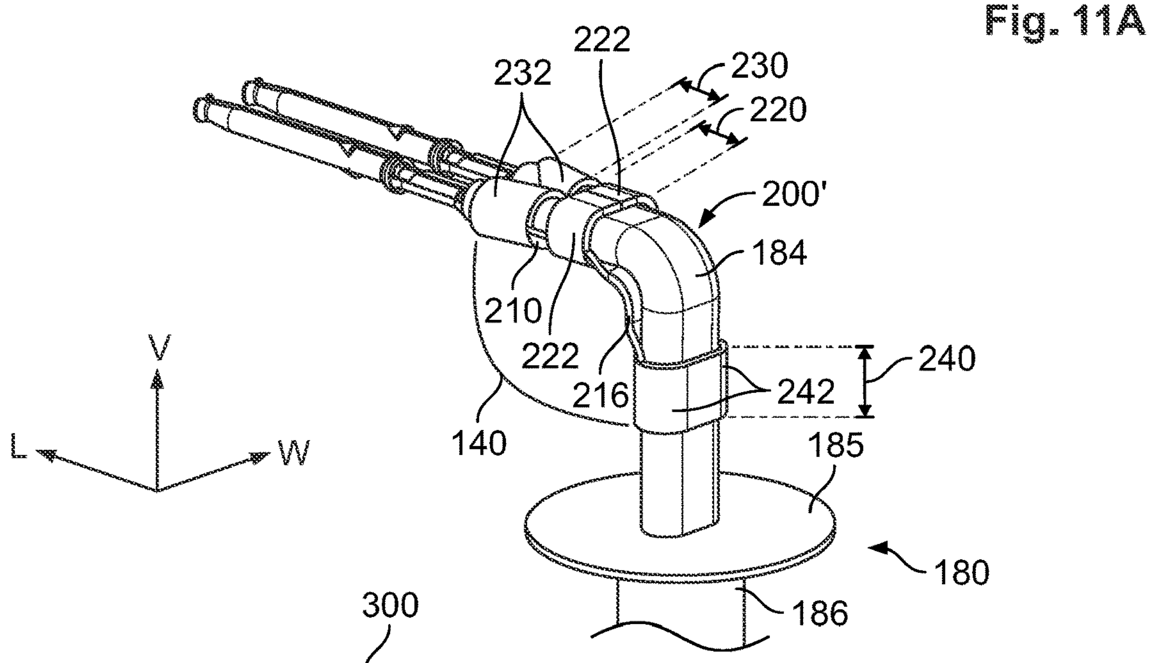
FIG. 11B is a perspective view of the cable and the inner ferrule of FIG. 11A with the inner ferrule in a bent position.

In a next step, as shown in FIG. 11B, the inner ferrule 200' is bent at the bend region 216 of the base 210. The bend region 216 is bent until the third crimp section 240 extends at the bend angle 140 described above with respect to the first crimp section 220 and the second crimp section 230. With the third crimp section 240 positioned at the bend angle 140 as shown in FIG. 11B, the third crimp wings 242 of the third crimp section 240 are crimped. The third crimp wings 242 press the foil 184 against the wires 183 to hold the foil 184 in place and electrically connect the inner ferrule 200' to the foil 184. The bending and crimping of the third crimp section 240 bends the cable 180 to the bend angle 140. In another embodiment, the third crimp section 240 can be crimped before the bend region 216 is bent and/or crimped such that the third crimp wings 242 do not primarily hold the foil 184 in place and electrically connect the inner ferrule 200' to the foil 184, but rather provide rough positioning and strain relief.

Figure 11C:
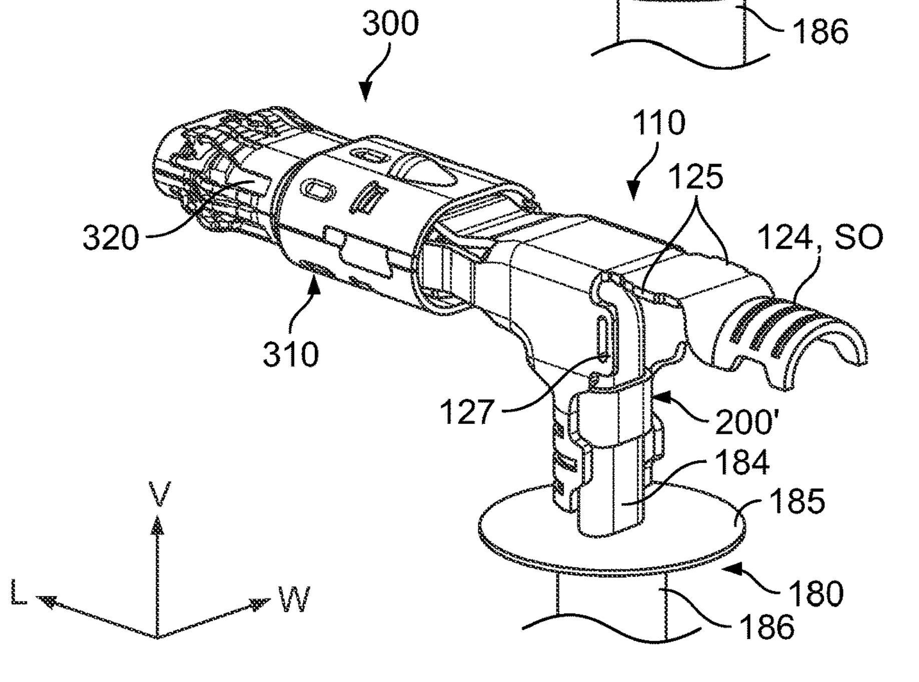
FIG. 11C is a perspective view of the cable with the inner ferrule of FIG. 11B in an angled shield, with a shield cover of the angled shield in an open shield position.

Following the bending of the inner ferrule 220' and the crimping of the third crimp section 240, the cable 180 and the crimped inner ferrule 200' are inserted into the angled shield 110 with the shield cover in the open shield position SO as shown in FIG. 11C. In the position shown in FIG. 11C, the braid 185 is flared outwards from the cable 180. The assembly of the angled connector 10' is then completed in the same manner as described above with respect to FIGS. 6E and 6F.

Figure 12:
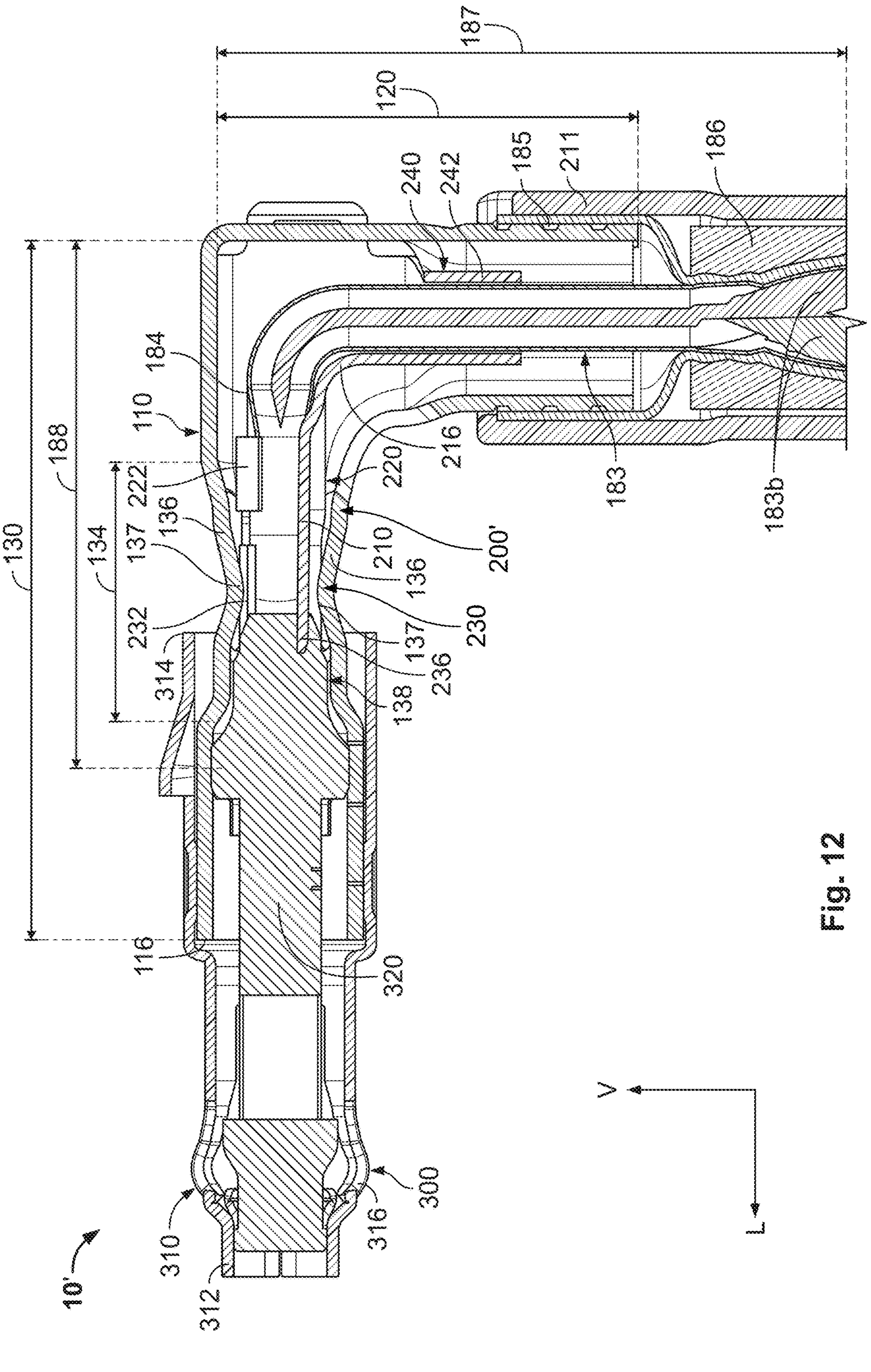
FIG. 12 is a sectional side view of the angled connector of FIG. 9.
Figure 13:
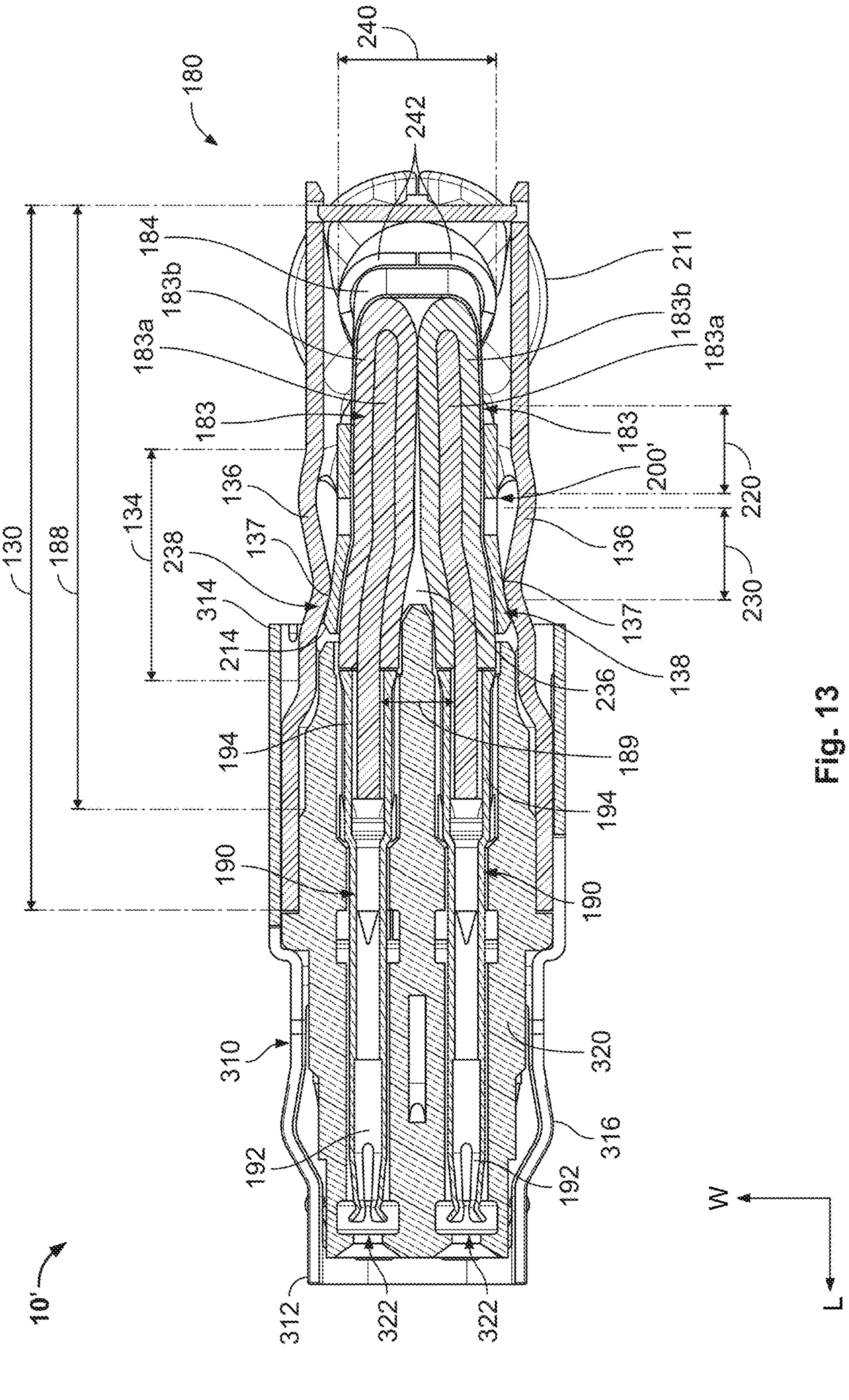
FIG. 13 is a sectional top view of the angled connector of FIG. 9.

The angled connector 10' is shown in a fully assembled state in FIGS. 12 and 13 in which the cable 180 is disposed and held within the angled shield 110. Only the position of the elements of the inner ferrule 200' will be described in detail with respect to FIGS. 12 and 13; the positioning and function of the other elements of the angled connector 10' is the same as described above with respect to FIGS. 7 and 8.

As shown in FIG. 12, the foil 184 is disposed around the wires 183 in the first portion 187 and the second portion 188 of the cable 180 and is held in abutment against the wire insulation **183*b* of the wires 183 by the first crimp section 220 and the third crimp section 240 of the inner ferrule 200'. The first crimp section 220 and the second crimp section 230 are disposed in the second shield section 130. The third crimp section 240 is disposed in the first shield section 120**.

The first crimp section 220 and the third crimp section 240 of the inner ferrule 200' are electrically and mechanically connected to the foil 184 by the crimping of the first crimp wings 222 and the third crimp wings 242. As shown in FIGS. 12 and 13, when the cable 180 with the inner ferrule 200' crimped to the cable 180 is positioned within the interior space 138 of the second shield section 130, the spring members 136 extending into the interior space 138 contact the inner ferrule 200'. The contact bend 137 of each of the spring members 136 contacts the second crimp section 230 of the inner ferrule 200' and the spring members 136 resiliently deflect to apply a pressure maintaining an abutment of the spring members 136 with the second crimp section 230. The spring members 136 form and maintain an electrical connection between the angled shield 110 and the inner ferrule 200'. The inner ferrule 200' electrically connects the angled shield 110 to the foil 184 through the crimping of the first crimp section 220 and the third crimp section 240.

In the angled connector 10', the first crimp section 220 and the third crimp section 240 of the inner ferrule 200' crimped over the foil 184 maintain a tight fit of the wire or wires 183 within the angled shield 110 and a tight wrap of the foil 184 around the wires 183 in the first portion 187 and the second portion 188. The bend region 216 of the inner ferrule 200' positions the cable 180 at the bend angle 140 to extend through the angled shield 110. The contact of the second crimp section 230 with the angled shield 110 at the spring members 136 forms a reliable electrical connection between the angled shield 110 and the foil 184 through the inner ferrule 200', aiding in the high degree of impedance control and improved shielding performance.

What is claimed is:

1. An angled subassembly of an angled connector, comprising:

an angled shield having a first shield section and a second shield section extending at a bend angle with respect to the first shield section;

a cable disposed in the first shield section and the second shield section of the angled shield, the cable having a wire and a foil disposed around the wire;

an angled dielectric disposed within the angled shield, the wire and the foil of the cable extend through the angled dielectric; and an inner ferrule disposed around the cable within the angled shield and electrically connecting the foil to the angled shield.

2. The angled subassembly of claim 1, wherein the inner ferrule has a first crimp section and a second crimp section connected to the first crimp section by a base, the first crimp section is disposed around the foil and the wire and the second crimp section is disposed around the wire.

3. The angled subassembly of claim 2, wherein the wire is one of a pair of wires disposed within the foil of the cable, the base has a fan protrusion in the second crimp section extending partially between the pair of wires.

4. The angled subassembly of claim 3, wherein the wires are positioned adjacent to one another in the first crimp section, the second crimp section has a flared shape that holds the wires at a pitch separated from one another at an end of inner ferrule.

5. The angled subassembly of claim 2, wherein the first crimp section and the second crimp section are disposed in the second shield section of the angled shield.

6. The angled subassembly of claim 5, wherein the inner ferrule has a third crimp section connected to the first crimp section and the second crimp section by the base, the third crimp section is disposed around the foil and the wire.

7. The angled subassembly of claim 6, wherein the third crimp section is separated from the first crimp section and the second crimp section by a bend region of the base, the third crimp section extends at the bend angle with respect to the first crimp section and the second crimp section.

8. The angled subassembly of claim 7, wherein the third crimp section is disposed in the first shield section of the angled shield.

9. The angled subassembly of claim 1, wherein the angled shield has a plurality of spring members in the second shield section resiliently contacting the inner ferrule.

10. The angled subassembly of claim 1, wherein the angled shield has a shield body and a shield cover attached to the shield body, the shield cover is pivotable with respect to the shield body between an open shield position in which the cable is insertable into the shield body and a closed shield position enclosing the cable in the shield body.

11. The angled subassembly of claim 10, wherein the shield body has a shield latch and the shield cover has a shield catch, the shield catch engages the shield latch to secure the shield cover in the closed shield position.

12. The angled subassembly of claim 1, wherein the angled dielectric has a first dielectric section and a second dielectric section extending at the bend angle with respect to the first dielectric section, the inner ferrule is disposed adjacent to the second dielectric section.

13. The angled subassembly of claim 1, further comprising a contact having a connection portion connected to the cable, the connection portion is disposed in the second shield section.

14. A method of assembling an angled subassembly of an angled connector, comprising:

providing a cable having a wire and a foil disposed around the wire;

crimping an inner ferrule around the cable; and inserting the cable with the inner ferrule crimped around the cable into an angled shield having a first shield section and a second shield section extending at a bend angle with respect to the first shield section, the cable is disposed in the first shield section and the second shield section, the inner ferrule electrically connects the foil to the angled shield, the inner ferrule bent to the bend angle prior to inserting the cable with the inner ferrule into the angled shield.

15. The method of claim 14, wherein the angled shield has a shield body and a shield cover attached to the shield body, the cable with the inner ferrule is inserted into the shield body with the shield cover in an open shield position, and further comprising pivoting the shield cover with respect to the shield body into a closed shield position.

16. An angled subassembly of an angled connector, comprising:

an angled shield having a first shield section and a second shield section extending at a bend angle with respect to the first shield section;

a cable disposed in the first shield section and the second shield section of the angled shield, the cable having a wire and a foil disposed around the wire;

an inner ferrule disposed around the cable within the angled shield and electrically connecting the foil to the angled shield; and an outer ferrule disposed around the cable and the first shield section of the angled shield.

17. An angled subassembly of an angled connector, comprising:

an angled shield having a first shield section and a second shield section extending at a bend angle with respect to the first shield section;

a cable disposed in the first shield section and the second shield section of the angled shield, the cable having a wire and a foil disposed around the wire; and an inner ferrule disposed around the cable within the angled shield and electrically connecting the foil to the angled shield, the inner ferrule including:

a first crimp section;

a second crimp section connected to the first crimp section by a base, the first crimp section is disposed around the foil and the wire and the second crimp section is disposed around the wire; and a third crimp section connected to the first crimp section and the second crimp section by the base, the third crimp section extends at the bend angle with respect to the first crimp section and the second crimp section, and is separated from the first crimp section and the second crimp section by a bend region of the base.

18. The angled subassembly of claim 17, wherein the first crimp section and the second crimp section are disposed in the second shield section of the angled shield.

19. The angled subassembly of claim 17, wherein:

the first crimp section is disposed around the foil and the wire; and the second crimp section is disposed around the wire.

20. The angled subassembly of claim 19, wherein the third crimp section is disposed around the foil and the wire.

* * * * *